(12) United States Patent
Kumazaki et al.

(10) Patent No.: US 9,975,540 B2
(45) Date of Patent: May 22, 2018

(54) CONTROL APPARATUS FOR HYBRID VEHICLE

(71) Applicant: TOYOTA JIDOSHA KABUSHIKI KAISHA, Toyota-shi, Aichi-ken (JP)

(72) Inventors: Kenta Kumazaki, Anjo (JP); Atsushi Tabata, Okazaki (JP); Tooru Matsubara, Toyota (JP); Tatsuya Imamura, Okazaki (JP); Kazuyuki Shiiba, Miyoshi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 1 day.

(21) Appl. No.: 15/121,127

(22) PCT Filed: Nov. 27, 2014

(86) PCT No.: PCT/JP2014/081420
§ 371 (c)(1),
(2) Date: Aug. 24, 2016

(87) PCT Pub. No.: WO2015/129114
PCT Pub. Date: Sep. 3, 2015

(65) Prior Publication Data
US 2017/0021817 A1     Jan. 26, 2017

(30) Foreign Application Priority Data
Feb. 26, 2014 (JP) .................................. 2014-035275

(51) Int. Cl.
*B60W 10/06*     (2006.01)
*B60W 10/08*     (2006.01)
(Continued)

(52) U.S. Cl.
CPC ............. *B60W 20/10* (2013.01); *B60K 6/365* (2013.01); *B60K 6/383* (2013.01); *B60K 6/387* (2013.01);
(Continued)

(58) Field of Classification Search
CPC ...... B60W 10/06; B60W 10/08; B60W 10/26; B60W 20/00; B60W 20/10;
(Continued)

(56) References Cited

U.S. PATENT DOCUMENTS

| | | | | |
|---|---|---|---|---|
| 5,862,497 A * | 1/1999 | Yano | ...................... | B60K 6/485 180/65.25 |
| 6,000,378 A * | 12/1999 | Minowa | ................ | B60W 10/06 123/436 |
| 2008/0309093 A1* | 12/2008 | Ando | .................... | B60W 20/10 290/40 C |

FOREIGN PATENT DOCUMENTS

| | | |
|---|---|---|
| JP | H06-317194 | 11/1994 |
| JP | H07-166901 A | 6/1995 |

(Continued)

*Primary Examiner* — Genna M Mott
*Assistant Examiner* — Charles J Han
(74) *Attorney, Agent, or Firm* — Hunton Andrews Kurth LLP

(57) ABSTRACT

A control apparatus for a hybrid vehicle is provided with: an air-fuel ratio determinator configured to determine an air-fuel ratio of an internal combustion engine in a predetermined period until speed change by a transmission is actually performed; and a controller configured to control at least one of the internal combustion engine and an electric motor in such a manner that a possible amount of torque down of the internal combustion engine is increased if the air-fuel ratio of the internal combustion engine is lean in the predetermined period. By this, it is possible to avoid a detri- (Continued)

mental effect, such as a torque shock, deterioration of durability of a friction material, and the like, which can occur in the speed change.

6 Claims, 17 Drawing Sheets

(51) Int. Cl.
| | |
|---|---|
| *B60W 20/10* | (2016.01) |
| *B60K 6/445* | (2007.10) |
| *B60K 6/547* | (2007.10) |
| *B60L 11/14* | (2006.01) |
| *B60W 10/26* | (2006.01) |
| *B60W 20/00* | (2016.01) |
| *F02D 41/02* | (2006.01) |
| *F02D 29/02* | (2006.01) |
| *B60K 6/365* | (2007.10) |
| *B60K 6/383* | (2007.10) |
| *B60K 6/387* | (2007.10) |
| *F16H 3/72* | (2006.01) |
| *F16H 3/66* | (2006.01) |
| *B60K 6/38* | (2007.10) |
| *F02M 26/06* | (2016.01) |
| *F02M 26/23* | (2016.01) |

(52) U.S. Cl.
CPC .............. *B60K 6/445* (2013.01); *B60K 6/547* (2013.01); *B60L 11/14* (2013.01); *B60W 10/06* (2013.01); *B60W 10/08* (2013.01); *B60W 10/26* (2013.01); *B60W 20/00* (2013.01); *F02D 29/02* (2013.01); *F02D 41/023* (2013.01); *F16H 3/66* (2013.01); *F16H 3/728* (2013.01); *B60K 2006/381* (2013.01); *B60W 2710/0622* (2013.01); *F02D 2250/21* (2013.01); *F02M 26/06* (2016.02); *F02M 26/23* (2016.02); *F16H 2200/0043* (2013.01); *F16H 2200/201* (2013.01); *F16H 2200/2007* (2013.01); *F16H 2200/2043* (2013.01); *F16H 2200/2066* (2013.01); *F16H 2200/2082* (2013.01); *Y02T 10/6239* (2013.01); *Y02T 10/70* (2013.01); *Y02T 10/7077* (2013.01)

(58) Field of Classification Search
CPC ........ B60W 2710/0622; F02D 2250/21; F02D 29/02; F02D 41/023; F02M 26/06; F02M 26/23

See application file for complete search history.

(56) References Cited

FOREIGN PATENT DOCUMENTS

| | | |
|---|---|---|
| JP | 3166595 B2 | 5/2001 |
| JP | 2007-186197 | 7/2007 |
| JP | 2008-196502 A | 8/2008 |
| JP | 2009-144575 A | 7/2009 |
| JP | 2009144575 A * | 7/2009 |

* cited by examiner

FIG. 3

|   | C1 | C2 | C3 | B1 | B2 | F1 |
|---|---|---|---|---|---|---|
| 1ST | ○ |  |  |  | ◎ | ○ |
| 2ND | ○ |  |  | ○ |  |  |
| 3RD | ○ | ○ |  |  |  |  |
| 4TH |  | ○ |  | ○ |  |  |
| Rev |  |  | ○ |  | ○ |  |
| N |  |  |  |  |  |  |

○Engage  ◎Engage in stepped speed change,
Release in stepless speed change

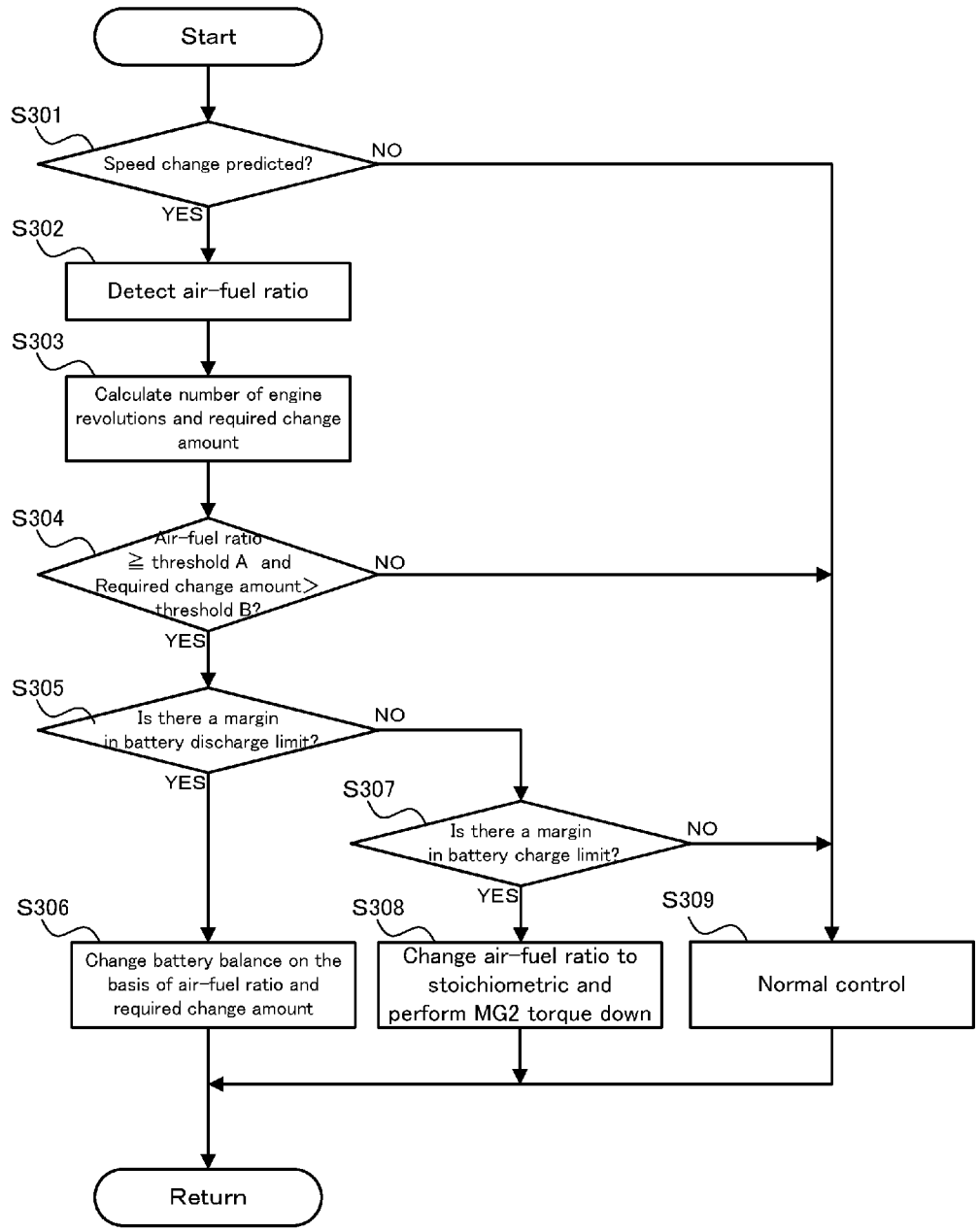

CONTROL APPARATUS FOR HYBRID VEHICLE

CROSS-REFERENCE TO RELATED APPLICATIONS

This is a national phase application based on the PCT International Patent Application No. PCT/JP2014/081420 filed Nov. 27, 2014, claiming priority to Japanese Patent Application No. 2014-035275 filed Feb. 26, 2014, the entire contents of both of which are incorporated herein by reference.

TECHNICAL FIELD

The present invention relates to a control apparatus for a hybrid vehicle, configured to control a hybrid vehicle including, for example, an internal combustion and an electric motor as power sources.

BACKGROUND ART

In the hybrid vehicle, for example, in order to improve fuel consumption efficiency, it is known to enable the internal combustion engine to perform lean combustion (e.g. refer to Patent Literatures 1 and 2).

Moreover, in order to prevent a torque shock, deterioration of durability of a friction material, and the like in speed change or gear shift, it is known to perform torque down control on the internal combustion engine in the speed change (refer to Patent Literatures 3 and 4).

CITATION LIST

Patent Literature

Patent Literature 1: Japanese Patent Application Laid Open No. 2009-144575
Patent Literature 2: Japanese Patent Application Laid Open No. 2007-186197
Patent Literature 3: Japanese Patent Application Laid Open No. 2008-196502
Patent Literature 4: Japanese Patent Application Laid Open No. Hei 6-317194

SUMMARY OF INVENTION

Technical Problem

In the lean combustion of the internal combustion engine, increased torque variation causes a reduction in a torque down amount, which is based, for example, on retarded ignition timing. Thus, in the lean combustion of the internal combustion engine, even if the torque down control is to be performed in the speed change, the torque cannot be reduced enough to avoid the aforementioned detrimental effect, which is technically problematic.

The aforementioned problem is exemplified as one example of problems to be solved by the present invention. It is therefore an object of the present invention to provide a control apparatus for a hybrid vehicle configured to avoid the detrimental effect in the speed change even in the lean combustion.

Solution to Problem

The above object of the present invention can be achieved by a control apparatus for a hybrid vehicle, configured to control a hybrid vehicle, the hybrid vehicle including: a power source including an internal combustion engine and an electric motor, the internal combustion engine being configured to change an air-fuel ratio; and a transmission configured to change number of revolutions of the internal combustion engine, said control apparatus for the hybrid vehicle comprising: an air-fuel ratio determinator configured to determine an air-fuel ratio of the internal combustion engine in a predetermined period until speed change by the transmission is actually performed; and a controller configured to control at least one of the internal combustion engine and the electric motor in such a manner that a possible amount of torque down of the internal combustion engine is increased if the air-fuel ratio of the internal combustion engine is lean in the predetermined period.

The hybrid vehicle is a vehicle that is provided at least with: the internal combustion engine, which can adopt various aspects regardless of a fuel type, a fuel supply aspect, a fuel combustion aspect, an intake/exhaust system configuration, cylinder arrangement, or the like; and the electric motor, which can be configured as an electric motor generator, such as, for example, a motor generator, as the power source configured to supply power to a drive shaft. The internal combustion engine is configured to change the air-fuel ratio, and is designed to be able to realize, for example, lean combustion operation in which combustion is performed in a lower air-fuel ratio state than usual.

The hybrid vehicle is also provided with the transmission configured to change the number of revolutions of the internal combustion engine. The transmission is not limited to a mechanical transmission or speed change mechanism as provided between the power source and drive wheels, but also may include, for example, a transmission or speed change mechanism configured to perform simulated speed change, which changes only the number of revolutions of the internal combustion engine in equal power. The transmission is configured to perform the speed change, as occasion demands, for example, on the basis of a required driving force, which responds to a vehicle speed of the hybrid vehicle, an accelerator opening degree, or the like.

The control apparatus for the hybrid vehicle is a control apparatus configured to control such a hybrid vehicle, and can adopt forms of various computer systems or the like, such as various controllers or microcomputer apparatuses, and various processing units like a single or a plurality of electronic control units (ECUs), which can include, if necessary, for example, one or a plurality of central processing units (CPUs), micro processing units (MPUs), various processors or various controllers, and various storing devices, such as a read only memory (ROM), a random access memory (RAM), a buffer memory, and a flash memory.

In operation of the control apparatus for the hybrid vehicle, firstly, the air-fuel ratio of the internal combustion engine is determined by the air-fuel ratio determinator in the predetermined period until the speed change is actually performed. The "predetermined period" herein may include a period starting from an output time point of a speed change command outputted from a controller or the like, which is configured to control the operation of the transmission, to an actual start of the speed change operation performed by the transmission. A start point of the predetermined period is not limited to the output time point of the speed change command. For example, if it is predicted that the speed change is performed after a lapse of a certain period on the basis of the speed change of the hybrid vehicle, acceleration, the required driving force (or accelerator opening degree) or the like, then, a time point of the speed change prediction may be set as the start point. The air-fuel ratio determinator is configured to determine whether or not at least the air-fuel ratio of the internal combustion engine is lean.

Then, as a result of the determination by the air-fuel ratio determinator, if the air-fuel ratio of the internal combustion engine is lean in the predetermined period, at least one of the internal combustion engine and the electric motor is controlled by the controller in such a manner that the possible amount of the torque down of the internal combustion engine is increased. The "possible amount of the torque down" means a torque amount that can be reduced when the speed change is performed, and it may be a torque amount that can be directly reduced by controlling the internal combustion engine, or may be a torque amount that can be indirectly reduced by using torque of the electric motor.

Here, when the speed change is performed, it is able to perform the torque down control of the internal combustion engine in order to prevent a torque shock, deterioration of durability of a friction material, and the like. Thus, in the internal combustion engine in the speed change, the torque down is temporarily performed, for example, by retarded ignition timing or the like.

In the lean combustion of the internal combustion engine, however, increased torque variation causes a reduction in a torque down amount, which is based on the retarded ignition timing. Thus, in the lean combustion of the internal combustion engine, even if the torque down control is to be performed in the speed change, the torque cannot be reduced enough to avoid the aforementioned detrimental effect.

However, as described above, at least one of the internal combustion engine and the electric motor is controlled in such a manner that the possible amount of the torque down of the internal combustion engine is increased if the air-fuel ratio of the internal combustion engine is lean in the predetermined period. In other words, in preparation for the speed change, control for providing a margin or room in the possible amount of the torque down is performed. Specifically, for example, output distribution of the electric motor is increased, by which the possible amount of the torque down of the internal combustion engine using the torque of the electric motor is increased. Alternatively, the air-fuel ratio of the internal combustion engine is changed to be richer, by which the possible amount of the torque down of the internal combustion engine is increased.

As explained above, according to the control apparatus for the hybrid vehicle, even in the lean combustion of the internal combustion engine, the torque down of the internal combustion engine can be sufficiently realized in the speed change by keeping the possible amount of the torque down large in the period until the speed change is actually performed. It is therefore possible to avoid the detrimental effect, such as the torque shock, the deterioration of durability of the friction material, and the like, which can occur in the speed change.

In one aspect of the control apparatus for the hybrid vehicle, wherein said controller controls output distribution of the internal combustion engine and the electric motor in such a manner that the electric motor has larger output distribution than when the air-fuel ratio of the internal combustion engine is lean.

According to this aspect, if the air-fuel ratio of the internal combustion engine is lean in the predetermined period, the output distribution is controlled in such a manner that the electric motor has larger output distribution in order to increase the possible amount of the torque down of the internal combustion engine. Specifically, battery balance of the electric motor is controlled to a discharge side, and the electric motor is set to be able to output larger torque.

According to the control described above, even if the torque down cannot be sufficiently realized by the control of the internal combustion engine itself (e.g. retarded ignition timing, etc.), the torque down of the internal combustion engine can be realized by using toque outputted from the electric motor.

In the aspect in which the output distribution of the electric motor is increased, as described above, wherein said controller controls the output distribution in such a manner that the electric motor has larger output distribution as the air-fuel ratio of the internal combustion engine becomes leaner.

In this case, as the air-fuel ratio of the internal combustion engine in the predetermined period becomes leaner (i.e. as the air-fuel ratio increases), the electric motor is set to have larger output distribution. In other words, the possible amount of the torque down by the electric motor is increased in accordance with a reduction in the possible amount of the torque down of the internal combustion engine. It is therefore possible to realize the torque down control in the speed change while avoiding an unnecessary change in the output distribution.

Alternatively, in the aspect in which the output distribution of the electric motor is increased, as described above, wherein said controller controls the output distribution in such a manner that the electric motor has larger output distribution as a required change amount of the number of revolutions increases with respect to the internal combustion engine when the speed change is performed.

In this case, as the required change amount of the number of revolutions increases with respect to the internal combustion engine when the speed change is performed, the electric motor is set to have larger output distribution. In other words, if the required change amount of the number of revolutions is large with respect to the internal combustion engine and if the torque down amount required in the speed change is estimated to be large, the output distribution of the electric motor is increased by a relatively large amount. On the other hand, if the required change amount of the number of revolutions is small with respect to the internal combustion engine and if the torque down amount required in the speed change is estimated to be small, the output distribution of the electric motor is increased by a relatively small amount. It is therefore possible to realize the torque down control in the speed change while avoiding an unnecessary change in the output distribution.

If the required change amount of the number of revolutions with respect to the internal combustion engine does not reach a fixed value (i.e. if the required torque down amount is small and if it is estimated that there is no detrimental effect caused by the speed change even in a state in which the possible amount of the torque down is reduced), the output distribution may not be controlled.

In another aspect of the control apparatus for the hybrid vehicle, wherein said controller controls the internal combustion engine to change the air-fuel ratio thereof to be richer, and controls the electric motor to reduce an output thereof.

In this aspect, if the air-fuel ratio of the internal combustion engine is lean in the predetermined period, the air-fuel ratio of the internal combustion engine is changed to be richer in order to increase the possible amount of the torque down of the internal combustion engine. In other words, by changing the air-fuel ratio to be richer, torque variation of the internal combustion engine is reduced, and the possible amount of the torque down by the control of the internal combustion engine itself (e.g. retarded ignition timing control, etc.) is increased.

According to the aforementioned control, even if the possible amount of the torque down is not sufficient at the time point of the speed change prediction, the possible amount of the torque down can be sufficiently ensured before the speed change. It is not necessary to keep changing the air-fuel ratio of the internal combustion engine until it comes to rich combustion. Some effects can be achieved even if the air-fuel ratio is only brought close to stoichiometric combustion while being kept in the lean combustion.

Moreover, in this aspect, the control is performed not only to change the air-fuel ratio as described above, but also to reduce the output of the electric motor. This makes it possible to reduce an influence of an increase in output of the internal combustion engine due to the change of the air-fuel ratio to be richer.

In the aspect in which the air-fuel ratio is controlled to be richer, as described above, wherein said controller controls the internal combustion engine to change the air-fuel ratio thereof to be richer as a required change amount of the number of revolutions increases with respect to the internal combustion engine when the speed change is performed.

In this case, as the required change amount of the number of revolutions increases with respect to the internal combustion engine when the speed change is performed, the air-fuel ratio of the internal combustion engine is changed to be richer. In other words, if the required change amount of the number of revolutions is large with respect to the internal combustion engine and if the torque down amount required in the speed change is estimated to be large, the air-fuel ratio of the internal combustion engine is changed to be richer by a relatively large amount. On the other hand, if the required change amount of the number of revolutions is small with respect to the internal combustion engine and if the torque down amount required in the speed change is estimated to be small, the air-fuel ratio of the internal combustion engine is changed to be richer by a relatively small amount. It is therefore possible to realize the torque down control in the speed change while avoiding an unnecessary change in the air-fuel ratio.

If the required change amount of the number of revolutions with respect to the internal combustion engine does not reach a fixed value (i.e. if the required torque down amount is small and if it is estimated that there is no detrimental effect caused by the speed change even in a state in which the possible amount of the torque down is reduced), the air-fuel ratio may not be changed.

The operation and other advantages of the present invention will become more apparent from embodiments explained below.

BRIEF DESCRIPTION OF DRAWINGS

FIG. 3 is an operation/engagement table for the hybrid vehicle according to the first embodiment.

FIG. 17 is a flowchart illustrating operation of a control apparatus for a hybrid vehicle according to a third embodiment.

DESCRIPTION OF EMBODIMENTS

Hereinafter, a control apparatus for a hybrid vehicle in embodiments will be explained.

First Embodiment

A control apparatus for a hybrid vehicle in a first embodiment will be explained with reference to FIG. 1 to FIG. 13.
<Entire Configuration of Hybrid Vehicle>

Figure 1:
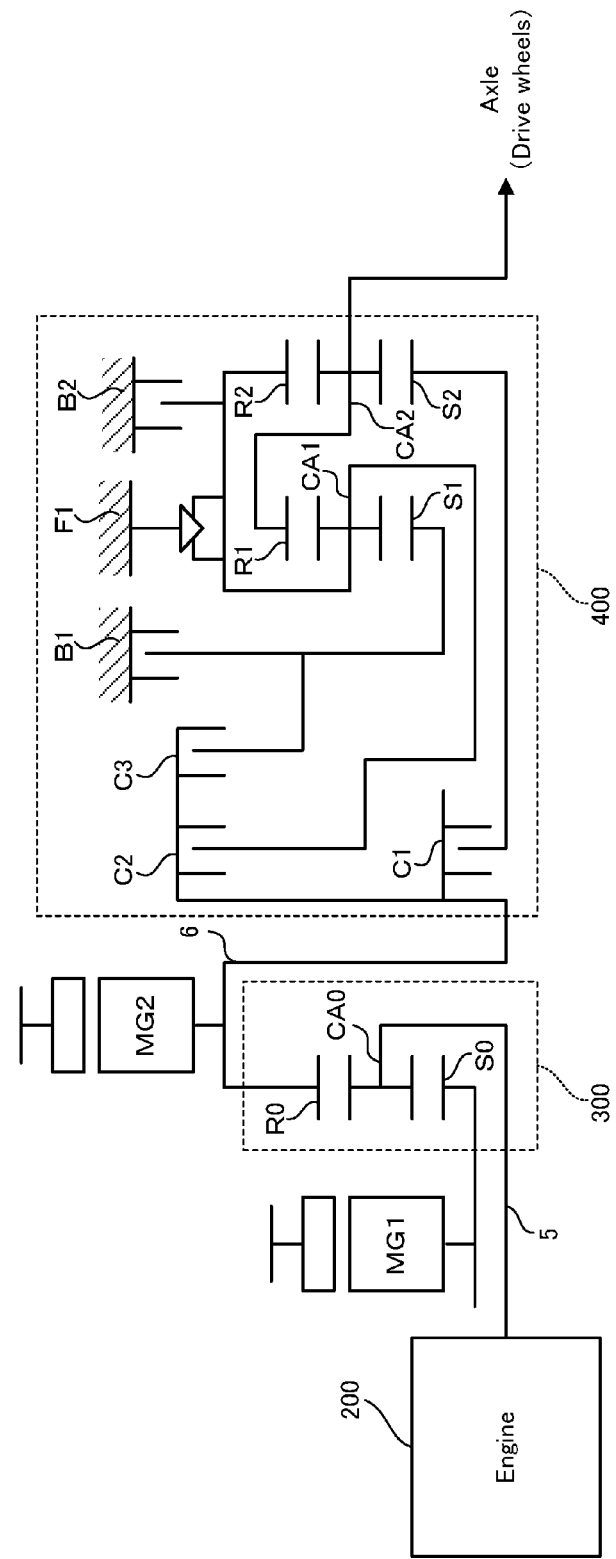
FIG. 1 is a skeleton diagram illustrating an entire configuration of a hybrid vehicle according to a first embodiment.

Firstly, with reference to FIG. 1, an entire configuration of a hybrid vehicle 1 according to the embodiment (particularly, a configuration of a drive mechanism) will be explained. FIG. 1 is a skeleton diagram illustrating the entire configuration of the hybrid vehicle according to the first embodiment.

As illustrated in FIG. 1, the hybrid vehicle 1 according to the embodiment is configured as a hybrid vehicle in which a plurality of power sources are combined. Specifically, the hybrid vehicle 1 is provided with an engine 200, a motor generator MG1, and a motor generator MG2, as power sources for running.

The engine 200 is a gasoline engine, which functions as a main power source of the hybrid vehicle 1 and which is one example of the "internal combustion engine".

Each of the motor generators MG1 and MG2 is an electric motor generator with a power-running function for converting electric energy to kinetic energy and with a regeneration function for converting kinetic energy to electric energy, and it is one example of the "electric motor". Each of the motor generators MG1 and MG2 is configured as an electric motor generator that may include: a rotor with a plurality of permanent magnets on its outer peripheral surface; and a stator around which a three-phase coil for forming a rotating magnetic field is wound. Of course, each of the motor generators, however, may also have another configuration.

Hereinafter, the motor generators MG1 and MG2 are sometimes collectively referred to as a "motor generator MG". Two or more motor generators MG may not be always provided. Moreover, an engagement element for controlling power transmission may be provided between the engine 200 and the motor generator MG.

The engine 200 and the motor generators MG1 and MG2 are coupled with each other via a single pinion type planetary gear mechanism 300. The planetary gear mechanism 300 may include a sun gear S0, which is an outer tooth gear, a ring gear R0, which is placed coaxially with the sun gear S0 and which is an outer teeth gear, and a carrier CA0, which rotationally and revolutionary holds a pinion engaged with the sun gear S0 and the ring gear R0.

An engine output shaft 5, which is an output shaft of the engine 200, is coupled with the carrier CA0 of the planetary gear mechanism 300, and the engine output shaft 5 integrally rotates with a carrier CA1. Thus, engine torque outputted by the engine 200 is transmitted to the carrier CA1. The motor generator MG1 is coupled with the sun gear S0 of the planetary gear mechanism 300. The motor generator MG2 is coupled with a drive shaft 6, which is coupled with the ring gear R0 of the planetary gear mechanism 300. Torque outputted from the engine 200 and the motor generators MG1 and MG2 is outputted via the drive shaft 6. A torque convert may be coupled with the drive shaft 6.

The drive shaft 6 is coupled with a transmission 400 configured to change a gear ratio of the hybrid vehicle. The transmission 400 is provided with two planetary gear mechanisms (specifically, a planetary gear mechanism including the sun gear S1, a ring gear R1, and the carrier CA1, and a planetary gear mechanism including a sun gear S2, a ring gear R2, and a carrier CA2), a first clutch C1, a second clutch C2, a third clutch C3, a one-way clutch F1, a first brake B1, and a second brake B2.

In the two planetary gear mechanisms, the carrier CA1 in one of them and the ring gear R2 in the other mechanism are coupled with each other. Moreover, the ring gear R1 in one of the planetary gear mechanisms and the carrier CA2 in the other mechanism are coupled with each other.

The first clutch C1 is configured to change a power transmission state between the drive shaft 6 and the sun gear S2. The second clutch C2 is configured to change a power transmission state between the drive shaft 6 and the carrier CA1. The third clutch C3 is configured to change a power transmission state between the drive shaft 6 and the sun gear S1.

The one-way clutch F1 is configured to change a power transmission state between the carrier CA1 and the ring gear R2 in a predetermined direction.

The first brake is configured to fix the rotation of the sun gear S1. The second brake is configured to fix the rotation of the carrier CA1 and the ring gear R2.

Torque transmitted via the transmission 400 is outputted to an axle side via the carrier CA2.

Torque transmitted via the transmission 400 is configured to be outputted to an axle side via the carrier CA2.

The configuration of the transmission 400 described above is merely one example, and the transmission 400 in another form may be also used as a mechanism configured to change the gear ratio of the hybrid vehicle. Moreover, not only a mechanical transmission but also a simulated transmission configured, for example, to change only the number of revolutions of the engine 200 in equal power may be used.

<Gear Ratio Realized by Transmission>

Figure 2:
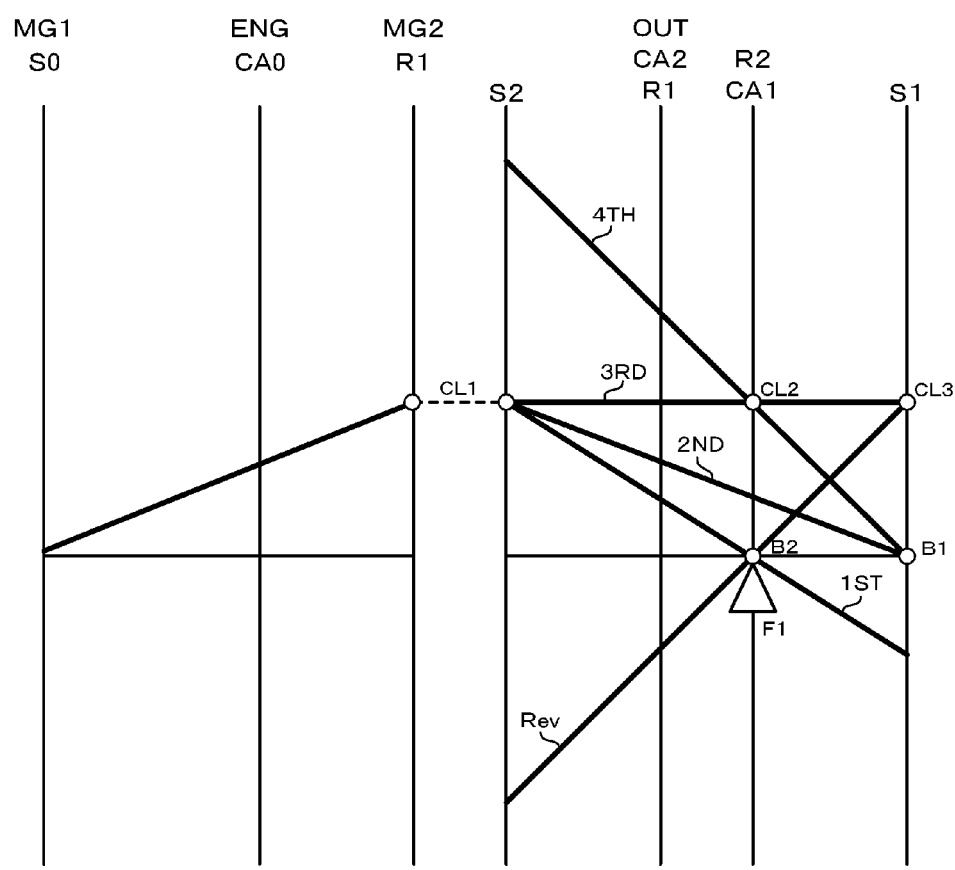
FIG. 2 is a velocity diagram for the hybrid vehicle according to the first embodiment.

Next, with reference to FIG. 2 and FIG. 3, the gear ratio that can be realized by the transmission 400 according to the embodiment will be specifically explained. FIG. 2 is a velocity diagram for the hybrid vehicle according to the first embodiment. FIG. 3 is an operation/engagement table for the hybrid vehicle according to the first embodiment.

As illustrated in FIG. 2 and FIG. 3, the transmission 400 according to the embodiment is configured to change the gear ratio of the hybrid vehicle at four steps (or five steps if including a reverse mode). Specifically, a gear ratio 1ST (i.e. a state with the highest gear ratio) is realized by engaging the first clutch C1, the second brake B2, and the one-way clutch F1 and by releasing the second clutch C2, the third clutch C3, and the first brake B1. A gear ratio 2ND (i.e. a state with the second highest gear ratio) is realized by engaging the first clutch C1 and the first brake B1, and by releasing the second clutch C2, the third clutch C3, the second brake B2, and the one-way clutch F1. A gear ratio 3RD (i.e. a state with the third highest gear ratio) is realized by engaging the first clutch C1 and the second clutch C2, and by releasing the third clutch C3, the first brake B1, the second brake B2, and the one-way clutch F1. A gear ratio 4TH (i.e. a state with the lowest gear ratio) is realized by engaging the second clutch C2 and the first brake B1, and by releasing the first clutch C1, the third clutch C3, the second brake B2, and the one-way clutch F1. The reverse mode is realized by engaging the third clutch C3 and the second brake B2, and by releasing the first clutch C1, the second clutch C2, the first brake B1, and the one-way clutch F1.

The transmission 400 according to the embodiment is configured to perform stepless or continuously-variable speed change in addition to stepped speed change. In the stepless or continuously-variable speed change, the second brake B2 is released if the gear ratio 1ST is realized.

<Configuration of Engine of Hybrid Vehicle>

Figure 4:
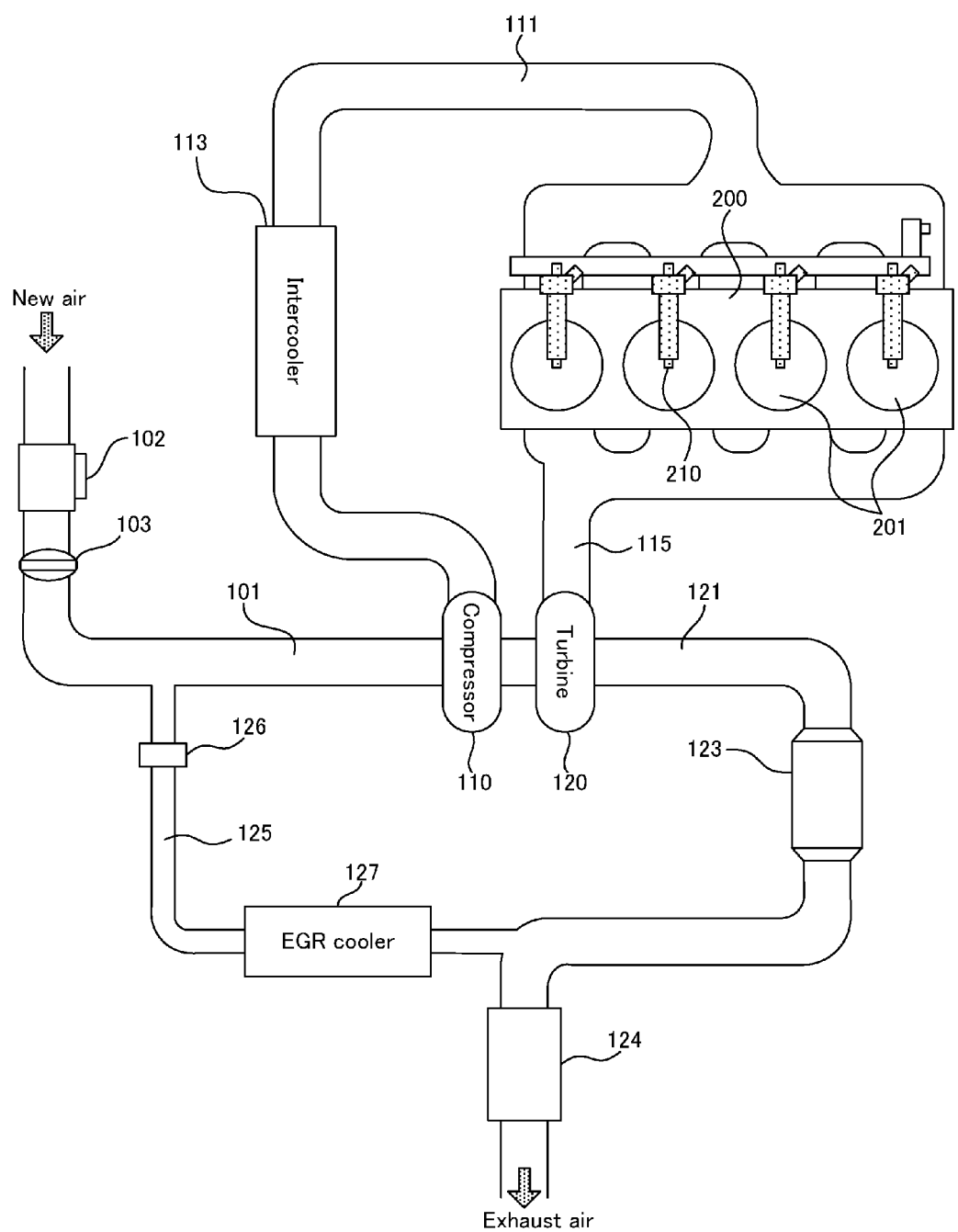
FIG. 4 is a schematic block diagram illustrating a configuration of an internal combustion engine of the hybrid vehicle according to the first embodiment.

Next, a configuration of the engine 200 of the hybrid vehicle 1 according to the embodiment will be explained with reference to FIG. 4. FIG. 4 is a schematic block diagram illustrating the configuration of the internal combustion engine of the hybrid vehicle according to the first embodiment.

In FIG. 4, the engine 200 according to the embodiment is configured as a supercharged engine provided with a compressor 110 and a turbine 120.

The compressor 110 is configured to compress an inflow air and supply it downstream as a compressed air. The turbine 120 is configured to rotate by using an exhaust air supplied via an exhaust pipe 115 from the engine 200 as power. The turbine 120 is coupled with the compressor 110 via a shaft and is configured to rotate integrally with the compressor 110. In other words, the turbine 120 and the compressor 110 may constitute a turbocharger.

The engine 200 is, for example, an inline four-cylinder engine in which four cylinders 201 are arranged in line in a cylinder block. Although a detailed illustration is omitted here, the engine 200 is configured to convert reciprocating motion of a piston, which occurs during combustion of an air-fuel mixture in each cylinder 201, to rotational motion of a crankshaft via a connecting rod.

In an intake pipe 101 on an inlet side of the compressor 110 (i.e. on an upstream side of the compressor 110), an airflow meter 102 is provided. The airflow meter 102 is configured to detect the amount of an air sucked from the exterior. At a subsequent stage of the airflow meter 102, an intake throttle valve 103 is provided. The intake throttle valve 103 is, for example, an electronically-controlled valve, and is configured in such a manner that its opening/closing operation is controlled by a not-illustrated throttle valve motor. By the opening/closing operation of the intake throttle valve 103, the amount of the air that flows in the intake pipe 101 is adjusted.

In an intake pipe 111 on an outlet side of the compressor 110 (i.e. on a downstream side of the compressor 110) and on an intake side of the engine 200 (i.e. on an upstream side of the cylinders 201), an intercooler 113 is provided. The intercooler 113 is configured to cool an intake air and increase air supercharging efficiency.

Into a combustion chamber of each cylinder 201 of the engine 200, an air-fuel mixture is sucked, wherein the air-fuel mixture is obtained by mixing an air supplied via the intake pipe 111 and a fuel injected from an injector 210. The air-fuel mixture led into the cylinder 201 from the intake side is ignited by a not-illustrated ignition plug, compression ignition, or the like, and an explosion stroke is performed in the cylinder 201. If the explosion stroke is performed, the burned air-fuel mixture (including a partially unburned air-fuel mixture) is emitted to a not-illustrated exhaust port in an exhaust stroke following the explosion stroke. An exhaust air emitted to the exhaust port is led to the exhaust pipe 115.

In an exhaust pipe 121 on an outlet side of the turbine 120 (i.e. on a downstream of the turbine 120), an EGR system is provided, wherein the EGR system is provided with a start converter 123, a post-processing apparatus 124, an EGR pipe 125, an EGR valve 126, and an EGR cooler 127.

The start converter 123 may include, for example, an oxidation catalyst, and is configured to purify substances contained in the exhaust air that passes through the turbine 120.

The post-processing apparatus 124 is provided on a downstream side of the start converter 123 in the exhaust pipe 122, and is configured to collect and reduce particulate matters contained in the exhaust air.

The EGR pipe 125 is configured to re-circulate the exhaust air that is on the downstream of the start converter 123, to the intake pipe 101, which is located on the inlet side of the compressor 110. On the EGR pipe 125, the EGR valve 126 is configured to adjust the amount of an EGR gas is provided. Moreover, on the EGR pipe 125, the EGR cooler 127 configured to cool the EGR gas to be re-circulated is provided.

<Combustion Mode of Engine>

Figure 5:
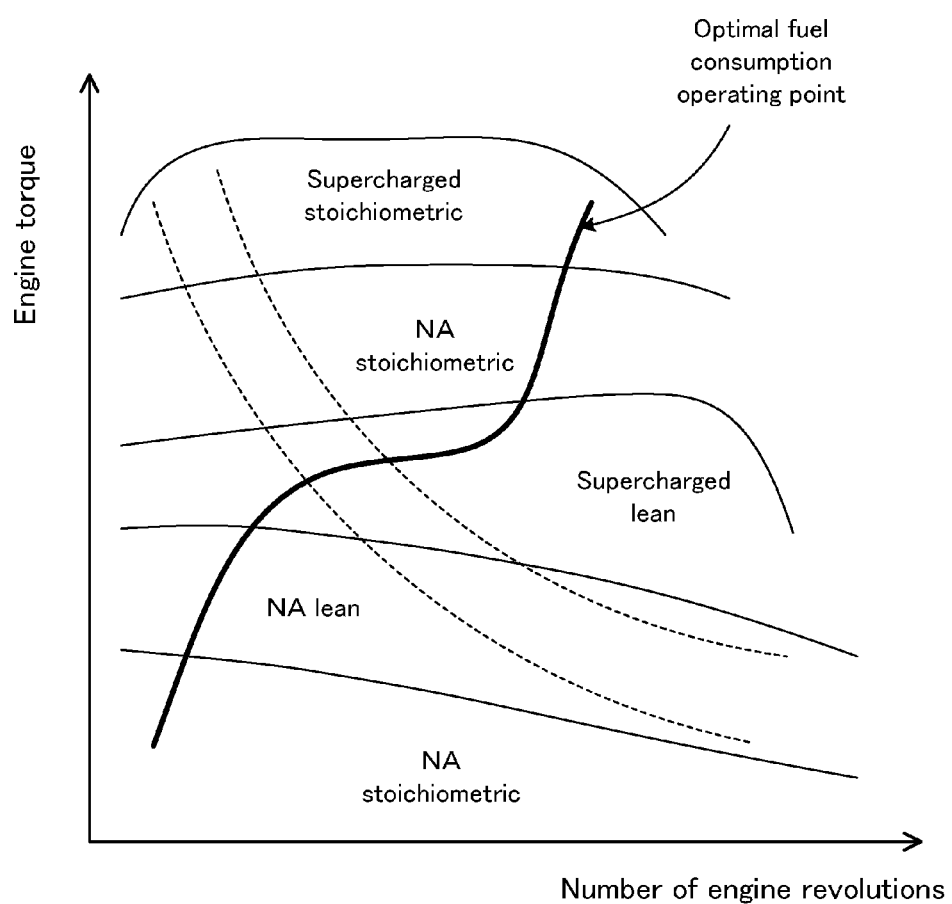
FIG. 5 is a map illustrating an operating point of the internal combustion engine of the hybrid vehicle according to the first embodiment.

Next, with reference to FIG. 5, a combustion mode that can be realized by the engine 200 according to the embodiment described above will be explained. FIG. 5 is a map illustrating an operating point of the internal combustion engine of the hybrid vehicle according to the first embodiment.

In FIG. 5, the engine 200 according to the embodiment is configured to realize not only normal natural aspiration (NA) combustion but also combustion with supercharging because it is configured as the supercharged engine as described above. Moreover, in each of the NA combustion and the combustion with supercharging, it is considered that stoichiometric combustion in which an air-fuel mixture with a concentration close to a theoretical air-fuel ratio is used for the combustion and lean combustion in which an air-fuel ratio with a concentration lower than the theoretical air-fuel ratio is used for the combustion can be performed.

Each of the combustion states is selected from a relation between the number of engine revolutions and the engine torque, so as to realize an operation that is close to an optimal fuel consumption operating point, which is illustrated by a thick solid line in the drawing. The operation at the optimal fuel consumption operating point does not always need to be realized, and an operation at an operating point deviated from the optimal fuel consumption operating point may be realized in accordance with circumstances and specification.

<Running Modes of Hybrid Vehicle>

Figure 6:
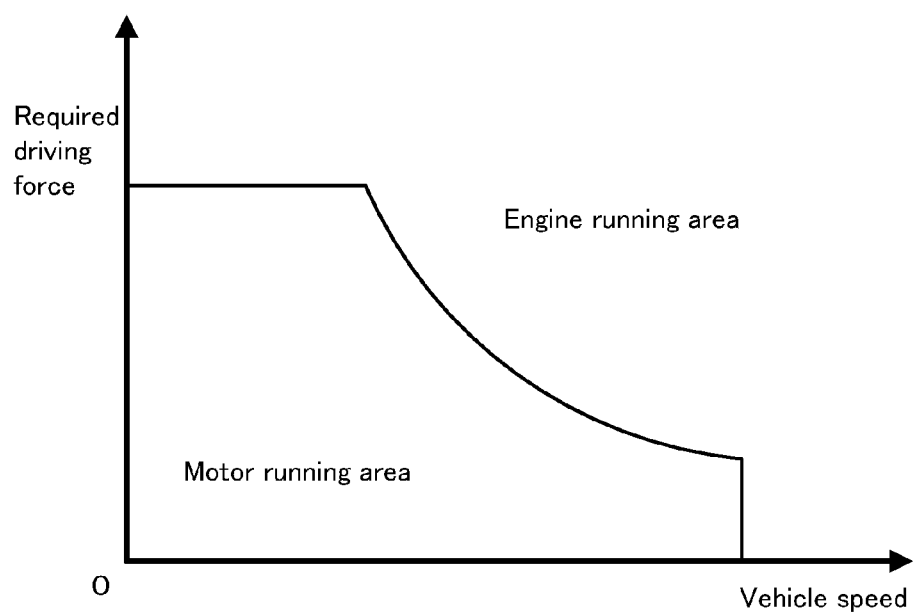
FIG. 6 is a map illustrating an engine running area and a motor running area of the hybrid vehicle according to the first embodiment.

Next, with reference to FIG. 6, running modes realized in the hybrid vehicle 1 will be explained. FIG. 6 is a map illustrating an engine running area and a motor running area of the hybrid vehicle according to the first embodiment.

In FIG. 6, the hybrid vehicle 1 according to the embodiment is configured to realize an EV mode in which the engine 200 is stopped and the hybrid vehicle 1 runs only with power of the motor generators MG1 and MG2, and a HV mode in which the engine 200 is operated and the hybrid vehicle 1 runs with power of the engine 200 and the motor generators MG1 and MG2.

The EV mode and the HV mode area determined in accordance with a vehicle speed and a required driving force of the hybrid vehicle 1. Specifically, the EV mode is selected in a relatively low vehicle speed and a relatively low required driving force, and the HV mode is selected in a relatively high vehicle speed and a relatively high required driving force. The map illustrated in FIG. 6 indicates a normal case. For example, in warm-up of the engine 200 and in state-of-charge (SOC) reduction, there is no motor running area (i.e. motor running cannot be performed).

<Configuration of Control Apparatus for Hybrid Vehicle>

Figure 7:
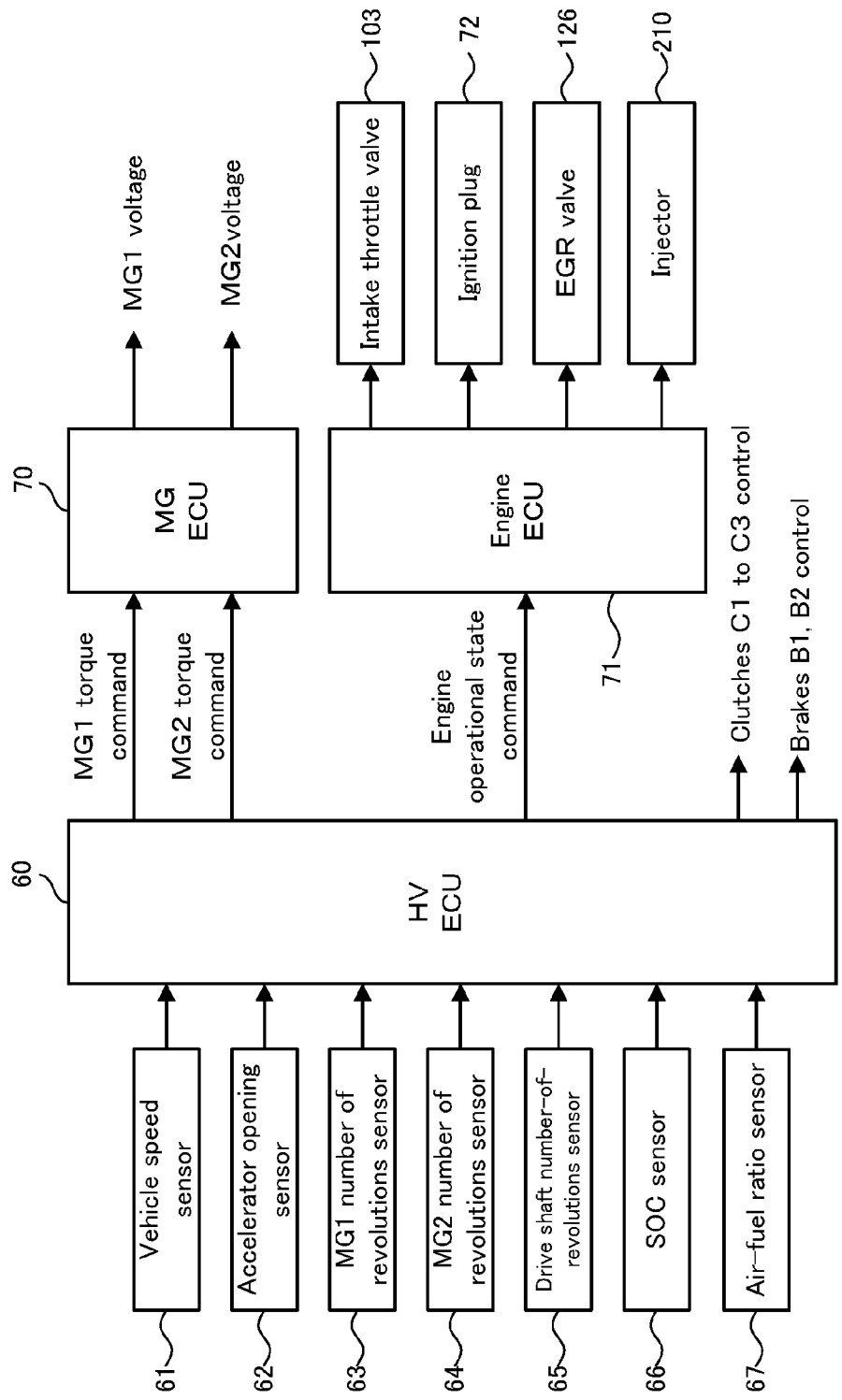
FIG. 7 is a block diagram illustrating a configuration of a control apparatus for a hybrid vehicle according to the first embodiment.

Next, with reference to FIG. 7, a configuration of a control apparatus for the hybrid vehicle according to the embodiment will be explained. FIG. 7 is a block diagram illustrating the configuration of the control apparatus for the hybrid vehicle according to the first embodiment.

In FIG. 7, each part of the hybrid vehicle 1 according to the embodiment is controlled by various electronic control units (ECUs).

Output signals are inputted into a HVECU 60, wherein the output signals are outputted from a vehicle speed sensor 61 configured to output a signal according to the vehicle speed of the vehicle 1, an accelerator opening sensor 62 configured to output a signal according to a stepping amount of an accelerator pedal, a MG 1 number-of-revolutions sensor 63 configured to output a signal according to a rotational speed of the motor generator MG1, a MG 2 number-of-revolutions sensor 64 configured to output a signal according to a rotational speed of the motor generator MG2, a drive shaft number-of-revolutions sensor 65 configured to output a signal according to a rotational speed of the drive shaft 6, a SOC sensor configured to output a signal according to a charge amount of a not-illustrated battery, an air-fuel ratio sensor 67 configured to detect the air-fuel ratio of the engine 200, and the like.

The HVECU 60 is configured to calculate torque to be generated by the motor generators MG1 and MG2, and to output a command to a MGECU 70 regarding the torque to be generated. Moreover, the HVECU 60 is configured to determine an operating condition of the engine 200, and to output a command to an engine ECU 71 regarding the operating condition of the engine 200. Moreover, the HVECU 60 is configured to determine a transmission ratio to be realized in accordance with the vehicle speed and the required driving force of the hybrid vehicle 1 or the like, and to control the engagement states of the first clutch C1, the second clutch C2, and the third clutch C3 of the transmission 400 and the first brake B1 and the second brake B2, and the like.

The MGECU 70 is configured to calculate voltage corresponding to the torque to be generated by the motor generators MG1 and MG2 on the basis of the command inputted from the HVECU 60, and to output the voltage to each of the motor generators MG1 and MG2.

The engine ECU 71 is configured to perform various controls on the intake throttle valve 103, the ignition plug 72, the EGR valve 126, the injector 210, and the like, on the basis of the command inputted from the HVECU 60.

<Operation of Control Apparatus for Hybrid Vehicle>

Figure 8:
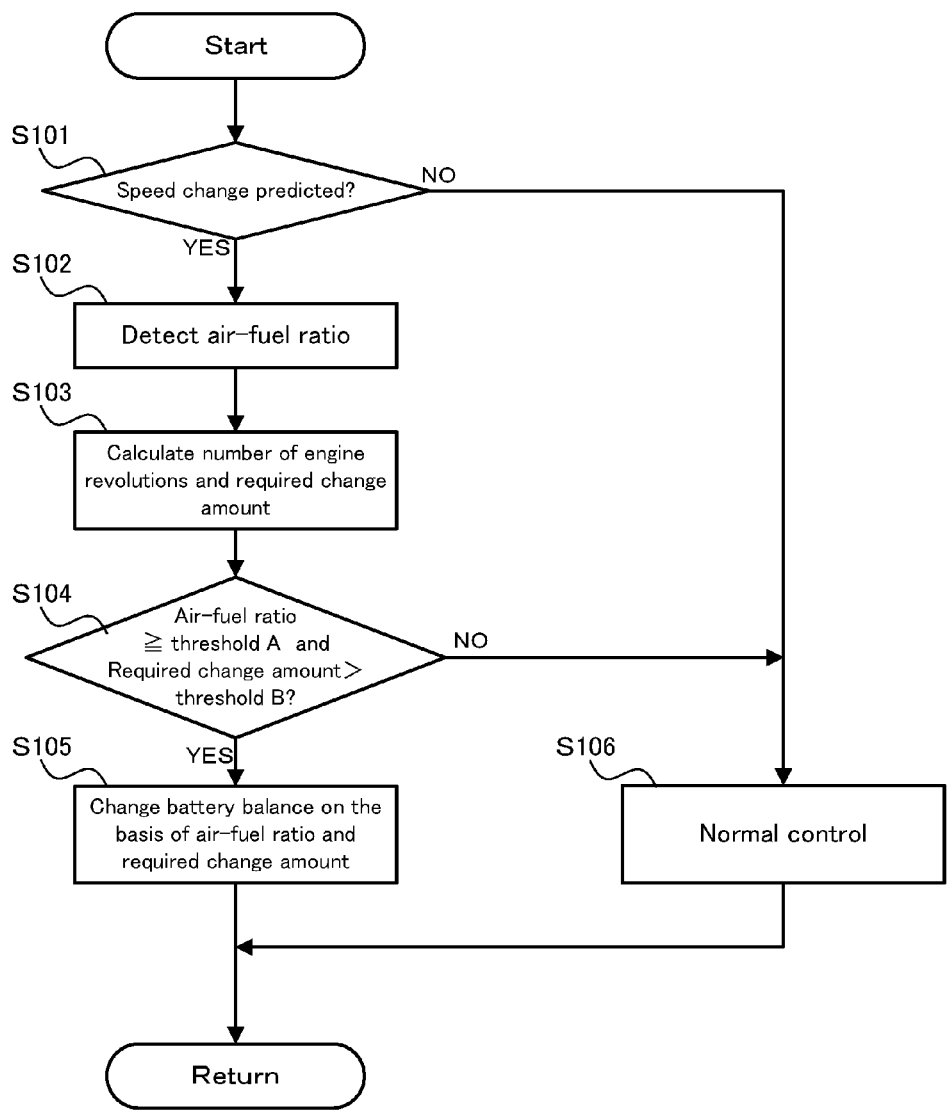
FIG. 8 is a flowchart illustrating operation of the control apparatus for the hybrid vehicle according to the first embodiment.

Next, with reference to FIG. 8, operation of the control apparatus for the hybrid vehicle according to the embodiment will be explained. FIG. 8 is a flowchart illustrating the operation of the control apparatus for the hybrid vehicle according to the first embodiment.

Figure 9:
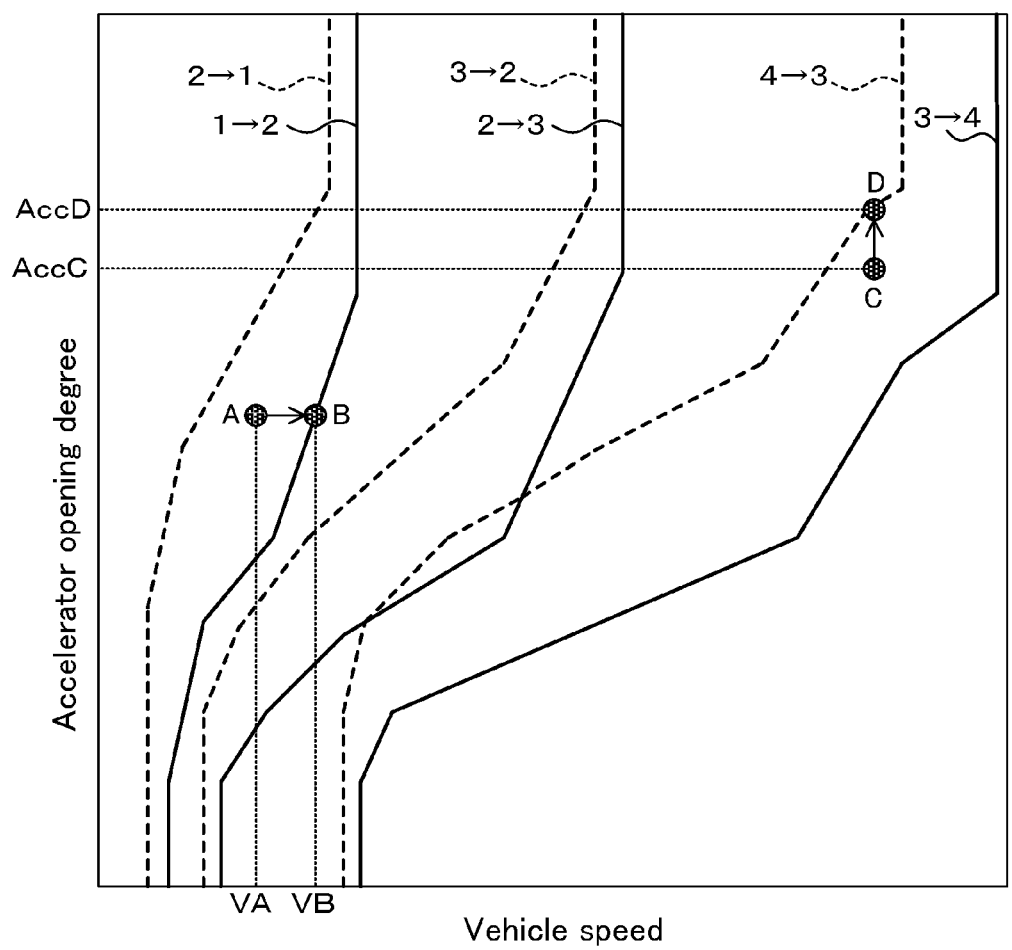
FIG. 9 is a speed change diagram illustrating a speed change predicting method in the control apparatus for the hybrid vehicle according to the first embodiment.

In FIG. 8, in operation of the control apparatus for the hybrid vehicle according to the embodiment, the speed change is predicted by the transmission 400 on the HVECU 60 (step S101). The speed change is predicted on the basis of, for example, the speed and acceleration of the hybrid vehicle 1, an accelerator opening degree, or the like. Hereinafter, with reference to FIG. 9, a specific speed change predicting method will be explained in detail. FIG. 9 is a speed change diagram illustrating the speed change predicting method in the control apparatus for the hybrid vehicle according to the first embodiment.

As illustrated in FIG. 9, in the hybrid vehicle 1 according to the embodiment, gear shift lines corresponding to the vehicle speed and the accelerator opening degree is set in advance. Specifically, if a point determined in accordance with the vehicle speed and the accelerator opening degree varies across a gear shift line, a gear shift or speed change according to the gear shift line is set to be performed. It is thus possible to predict the speed change, if the variation in the vehicle speed and the accelerator opening degree can be predicted.

For example, during running at a point A in the drawing, a vehicle speed difference $\Delta V (=VB-VA)$ between a point B and the point A is calculated, wherein the point B crosses a gear shift line that indicates a shift from the gear ratio 1ST to the gear ratio 2ND with the same accelerator opening degree. Then, acceleration a at the point A is calculated, and an estimated time Tup ($=\Delta V/\alpha$) until reaching the point B (i.e. until the gear shift or speed change) is calculated. Then, if the calculated estimated time Tup is less than or equal to a predetermined value, it is predicted that the gear shift or speed change from the gear ratio 1ST to the gear ratio 2ND is soon to be started.

Alternatively, during running at a point C in the drawing, an accelerator opening degree difference $\Delta Acc(=AccD-AccC)$ between a point D and the point C is calculated, wherein the point D crosses a gear shift line that indicates a shift from the gear ratio 4TH to the gear ratio 3RD with the same speed. Then, accelerator opening degree change rate $\delta Acc$ at the point C is calculated, and an estimated time Tdwn ($=\Delta Acc/\delta Acc$) until reaching the point D (i.e. until the gear shift or speed change) is calculated. Then, if the calculated estimated time Tdwn is less than or equal to a predetermined value, it is predicted that the gear shift or speed change from the gear ratio 4TH to the gear ratio 3RD is soon to be started.

Here, for simplification of explanation, the speed change is predicted on the premise that one of the accelerator opening degree and the vehicle speed is not changed; however, even if both the accelerator opening degree and the vehicle speed are changed, the speed change can be predicted by using the aforementioned parameters.

Back in FIG. 8, if the aforementioned speed change is not predicted (the step S101: NO), normal control is performed in the hybrid vehicle 1 (step S106), and a series of process operations is ended. On the other hand, if the speed change is predicted (the step S101: YES), the air-fuel ratio of the engine 200 is detected by the air-fuel ratio sensor 67 (step S102). In other words, in the embodiment, a start point of the "predetermined period" is a time point at which the speed change is predicted, and the air-fuel ratio of the engine 200 is detected in a period from the speed change prediction to the actual speed change (i.e. to the start of a gear shift or speed change operation of the transmission 400). The air-fuel ratio may be determined, for example, in a period after output of a gear shift or speed change command with respect to the transmission 400, instead of in the period after the speed change prediction.

If the air-fuel ratio is determined, a required change amount of the number of revolutions of the engine 200 (i.e. the number of revolutions required to be changed in the speed change) is calculated on the HVECU 60, on the basis of the present number of revolutions of the engine 200, the gear ratio after the speed change, or the like (step S103).

If the air-fuel ratio and the required change amount are obtained, it is determined on the HVECU 60 whether or not the air-fuel ratio is greater than or equal to a threshold value A and whether or not the required change amount is greater than a threshold value B (step S104). The threshold value A here is a threshold value for determining that the air-fuel ratio of the engine 200 is high enough to cause the detrimental effect in the speed change. The threshold value A is set in accordance with a reduction in possible amount of a torque down, wherein the reduction is caused by a lean air-fuel ratio. Moreover, the threshold value B is a threshold value for determining that the required change amount of the engine 200 is high enough not to perform torque down control, or that a torque down amount is not sufficient even if the torque down control is performed at a present time point. The threshold value B is set in accordance with the torque down amount in the speed change, which is determined in advance.

If it is determined that the air-fuel ratio is not greater than or equal to the threshold value A or that the required change amount is not greater than the threshold value B (the step S104: NO), it is determined that there is no detrimental effect even if particular control is not performed, and the normal control is performed (the step S106). On the other hand, if it is determined that the air-fuel ratio is greater than or equal to the threshold value A and that the required change amount is greater than the threshold value B (the step S104: YES), battery balance of the motor generator MG is changed on the basis of the air-fuel ratio and the required change amount (step S105). Specifically, the battery balance of the motor generator MG is controlled to be on a discharge side, by which the motor generator MG may be allowed to output larger torque.

Here, if the speed change is performed, it is able to perform the torque down control of the engine 200 in order to prevent a torque shock, deterioration of durability of a friction material, and the like. In the lean combustion of the engine 200 (i.e. in the case of a high air-fuel ratio), however, increased torque variation causes a reduction in the torque down amount, which is based on the control of the engine 200 itself (e.g. retarded ignition timing, etc.). Thus, in the lean combustion of the engine 200, even if the torque down control is to be performed in the speed change, there is a possibility that the torque cannot be reduced enough to avoid the detrimental effect in the speed change.

In contrast, in the embodiment, as described above, if it is determined that the air-fuel ratio of the engine 200 after the speed change prediction is greater than or equal to the threshold value A and that the required change amount is also greater than the threshold value B (i.e. if it is estimated that there is a possibility that the detrimental effect in the speed change may occur), the battery balance of the motor generator MG is changed to the discharge side. Thus, even if the torque down cannot be sufficiently realized by the control of the engine 200 itself, the torque down of the engine 200 can be realized by using the torque outputted from the motor generator MG.

To what extent the battery balance is changed to the discharge side may be determined in accordance with a shortage of the possible amount of the torque down. For example, if the air-fuel ratio is higher (i.e. if the air-fuel ratio is leaner), the battery balance may be further changed to the discharge side. If the required change amount to the number of engine revolutions is higher, the battery balance may be further changed to the discharge side.

<Specific Example of Speed Change Control>

Figure 10:
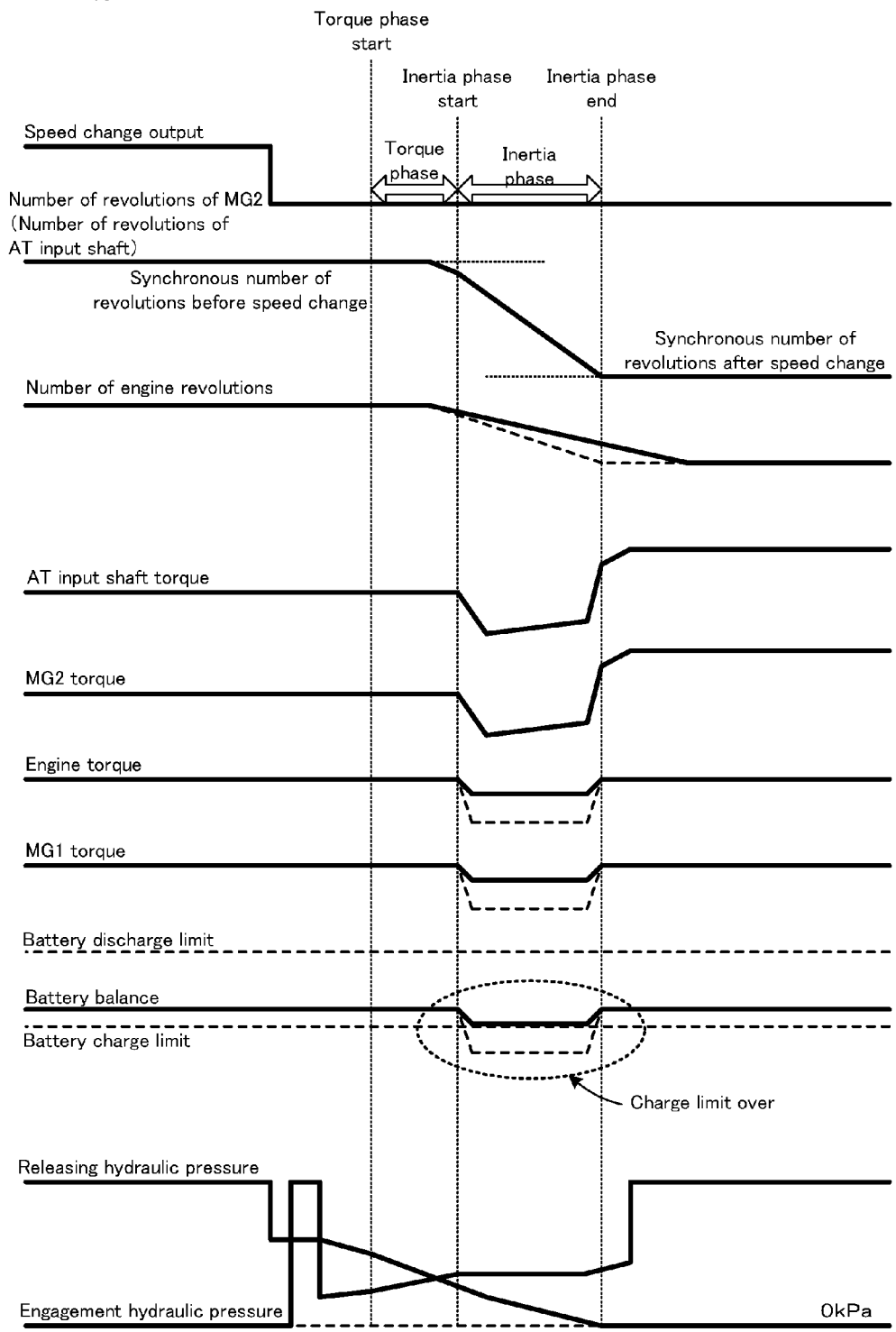
FIG. 10 is a time chart illustrating a problem that occurs in up-shift.
Figure 11:
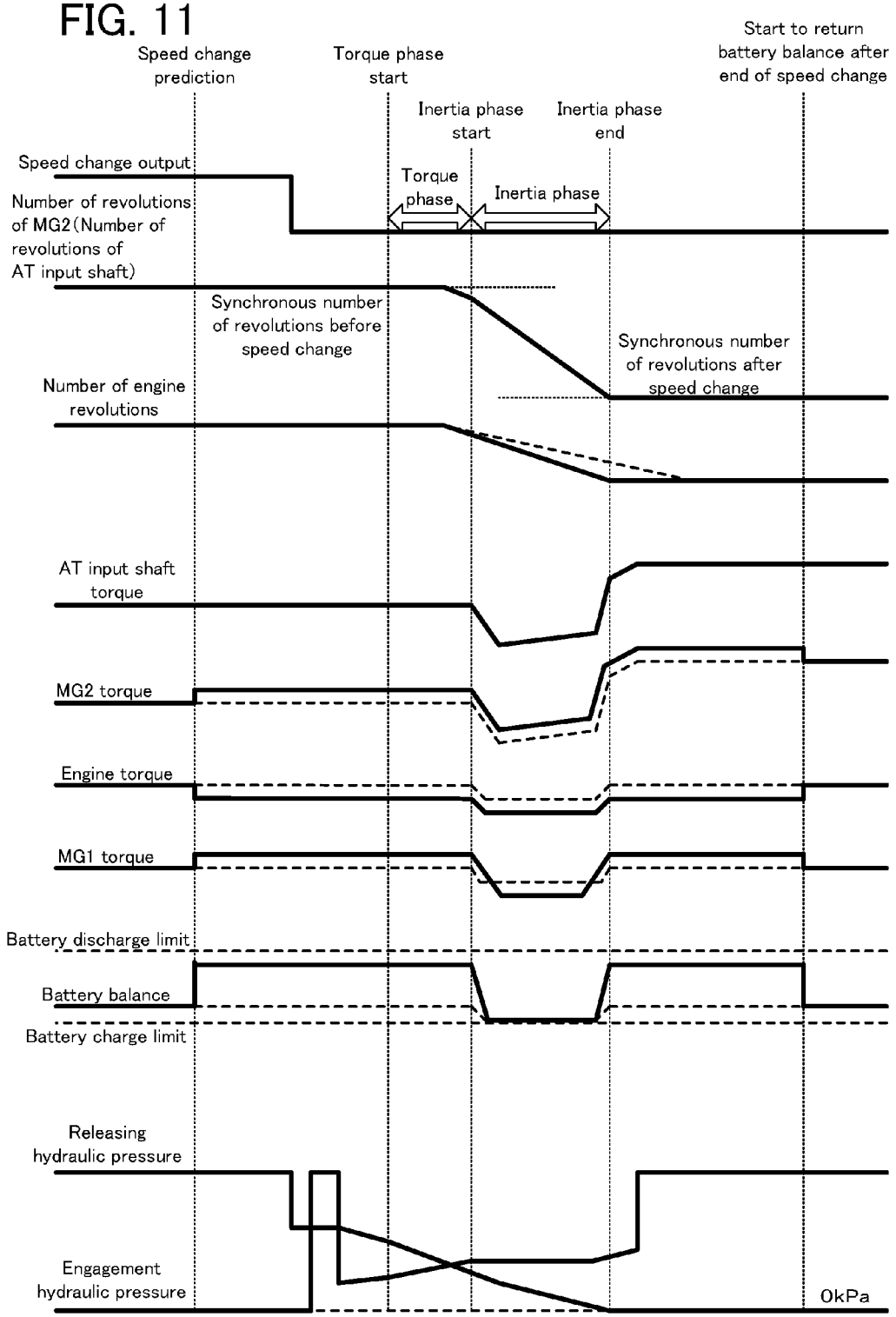
FIG. 11 is a time chart illustrating up-shift control by the control apparatus for the hybrid vehicle according to the first embodiment.
Figure 12:
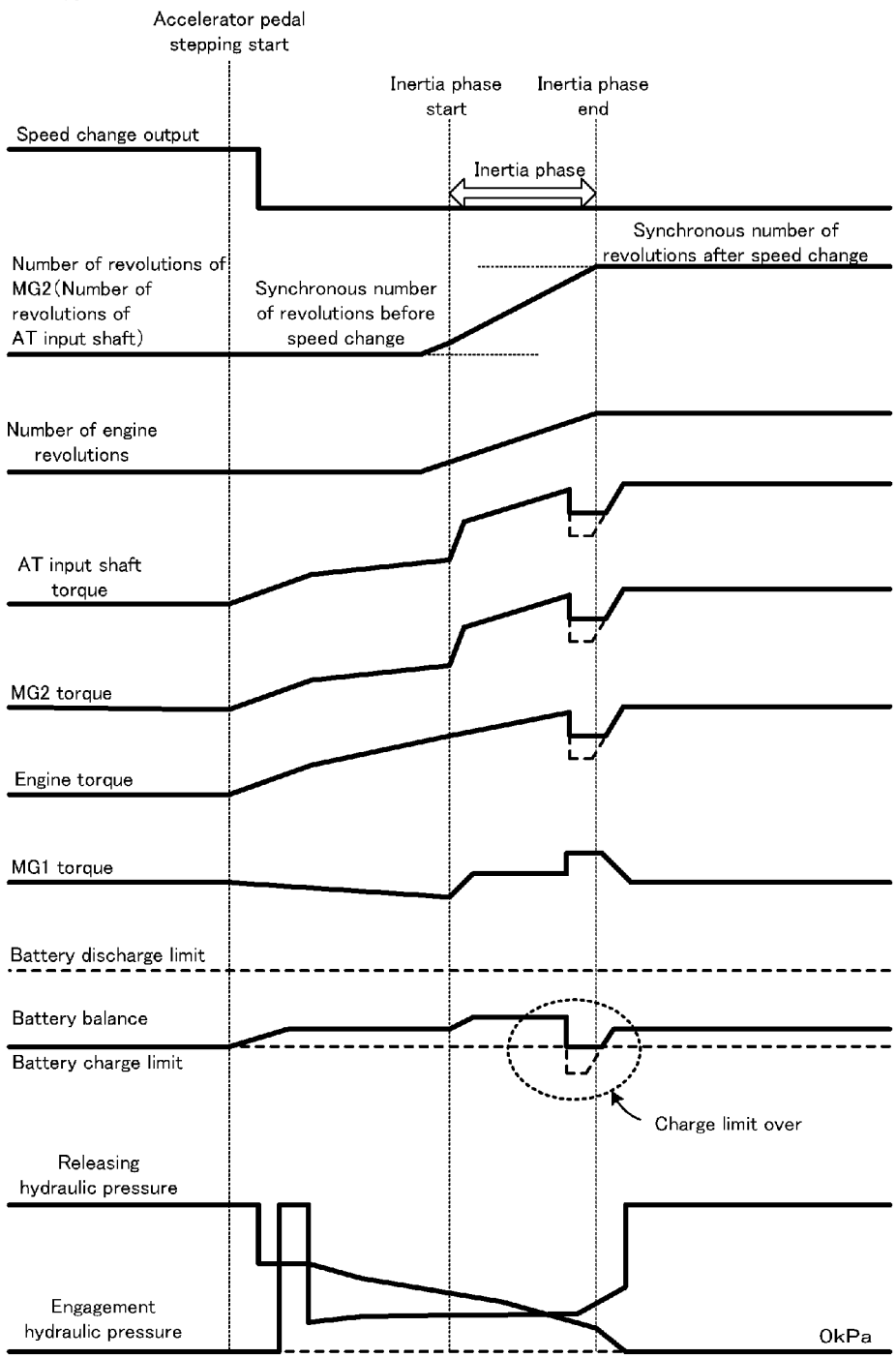
FIG. 12 is a time chart illustrating a problem that occurs in down-shift.
Figure 13:
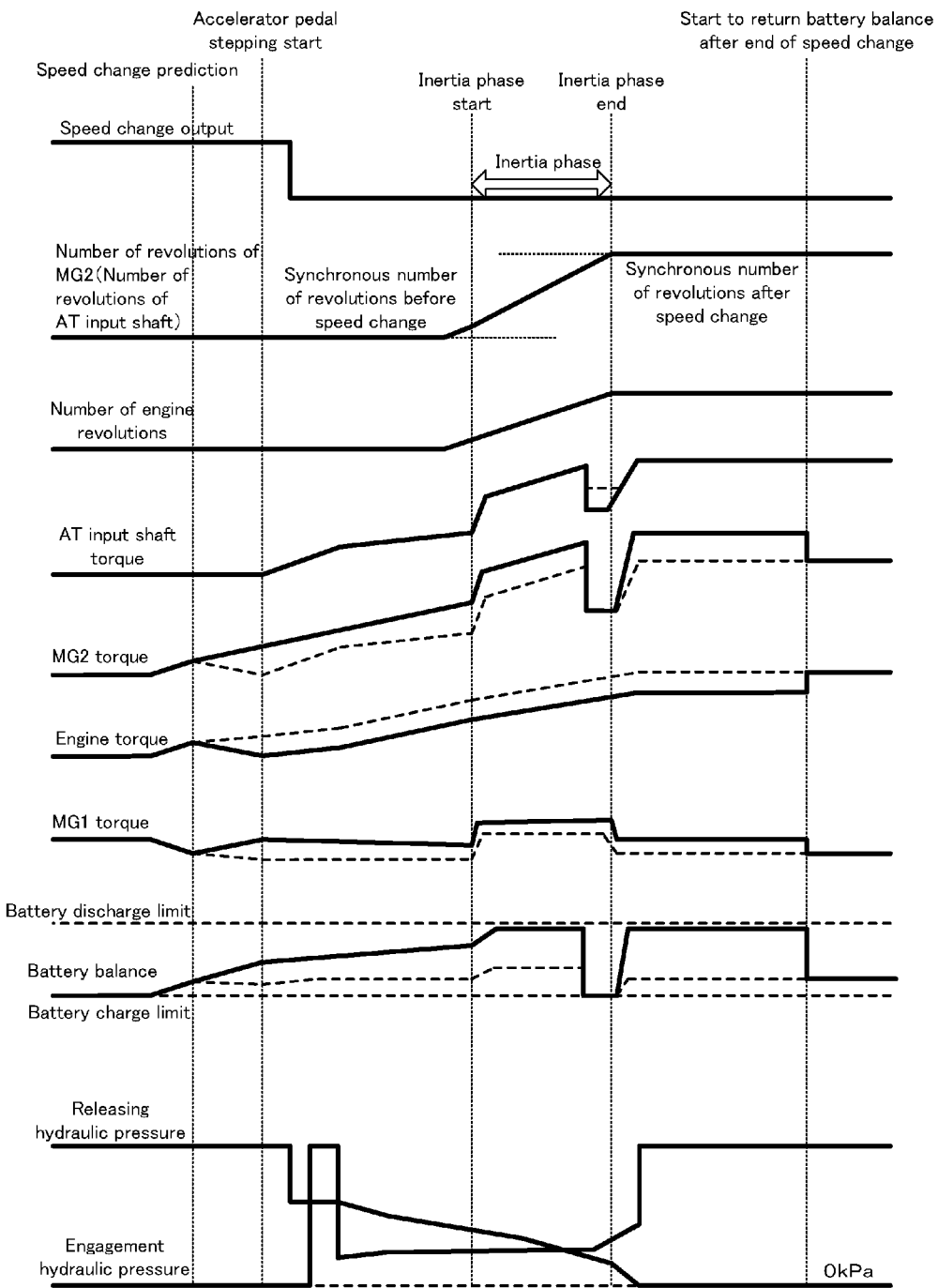
FIG. 13 is a time chart illustrating down-shift control by the control apparatus for the hybrid vehicle according to the first embodiment.

Next, with reference to FIG. 10 to FIG. 13, an explanation will be given to the detrimental effect that may occur in the speed change and a specific example of the control according to the embodiment for solving the detrimental effect. FIG. 10 is a time chart illustrating a problem that occurs in up-shift. FIG. 11 is a time chart illustrating up-shift control by the control apparatus for the hybrid vehicle according to the first embodiment. FIG. 12 is a time chart illustrating a problem that occurs in down-shift. FIG. 13 is a time chart illustrating down-shift control by the control apparatus for the hybrid vehicle according to the first embodiment.

As illustrated in FIG. 10, it is assumed that the speed change control according to the embodiment described above (i.e. control for providing a margin or room in the possible amount of the torque down) cannot be performed in the up-shift. In that case, if the battery balance is close to a charge limit value as illustrated in the drawing, that may cause a situation in which sufficient torque cannot be outputted from the motor generator MG1. In other words, the operation of the motor generator MG1 may be limited by the charge limit of the battery, and it may lead to a situation in which reaction torque for reducing the torque of the engine 200 cannot be sufficiently outputted in an inertia phase. This may delay a reduction in the number of engine revolutions, and may cause the torque shock, the deterioration of durability of the friction material, and the like in the speed change.

In contrast, in the embodiment, as illustrated in FIG. 11, the battery balance is changed to the discharge side at a time point at which the up-shift is predicted. Thus, there is a certain degree of margin in the output torque of the motor generator MG1. It is thus possible to sufficiently output the reaction torque in the inertia phase in which the torque of the engine 200 needs to be reduced. Therefore, the detrimental effect in the speed change as illustrated in FIG. 10 can be avoided. After the end of the speed change, control for returning the battery balance to a charge side again is performed.

In the battery balance control in the speed change prediction, torque sharing may be changed to reduce the output torque of the engine 200 and to increase the output torque of the motor generator MG2. In the same manner, in the battery balance control after the end of the speed change, the torque sharing may be changed to increase the output torque of the engine 200 and to reduce the output torque of the motor generator MG2, as illustrated in the drawing.

As illustrated in FIG. 12, it is assumed that the speed change control according to the embodiment described above cannot be performed in the down-shift. In that case, if the battery balance is close to the charge limit value as illustrated in the drawing, that may cause a situation in which sufficient torque cannot be outputted from the motor generator MG2. In other words, the operation of the motor generator MG2 may be limited by the charge limit of the battery, and it may lead to a situation in which the reaction torque for reducing the torque of the engine 200 cannot be sufficiently outputted near the end of the inertia phase. This may cause the torque shock, the deterioration of durability of the friction material, and the like in the speed change, as in the aforementioned up-shift.

In contrast, in the embodiment, as illustrated in FIG. 13, the battery balance is changed to the discharge side at a time point at which the down-shift is predicted. Thus, there is a certain degree of margin in the output torque of the motor generator MG2. It is thus possible to output sufficient reaction torque in the inertia phase in which the torque of the engine 200 needs to be reduced. Therefore, the detrimental effect in the speed change as illustrated in FIG. 12 can be avoided. After the end of the speed change, the control for returning the battery balance to the charge side again is performed.

In the battery balance control in the speed change prediction, the torque sharing may be changed to reduce the output torque of the engine 200 and to increase the output torque of the motor generator MG2. In the same manner, in the battery balance control after the end of the speed change, the torque sharing may be changed to increase the output torque of the engine 200 and to reduce the output torque of the motor generator MG2, as illustrated in the drawing.

As explained above, according to the control apparatus for the hybrid vehicle in the first embodiment, the possible amount of the torque down can be increased by predicting the speed change and changing the battery balance. Thus, even in the lean combustion of the engine 200, the torque down control can be sufficiently realized when the speed change is performed. It is therefore possible to avoid the detrimental effect, such as the torque shock, the deterioration of durability of the friction material, and the like, which can occur in the speed change.

Second Embodiment

Next, a control apparatus for a hybrid vehicle according to a second embodiment will be explained with reference to FIG. 14 to FIG. 16. The second embodiment is partially different from the first embodiment in operation, and is substantially the same as the first embodiment in the other operation and apparatus configuration. Thus, hereinafter, the different part from that of the first embodiment will be explained in detail, and an explanation of the same part will be omitted, as occasion demands.

<Operation of Control Apparatus for Hybrid Vehicle>

Firstly, with reference to FIG. 14, operation of the control apparatus for the hybrid vehicle according to the second embodiment will be explained. FIG. 14 is a flowchart illustrating the operation of the control apparatus for the hybrid vehicle according to the second embodiment.

Figure 14:
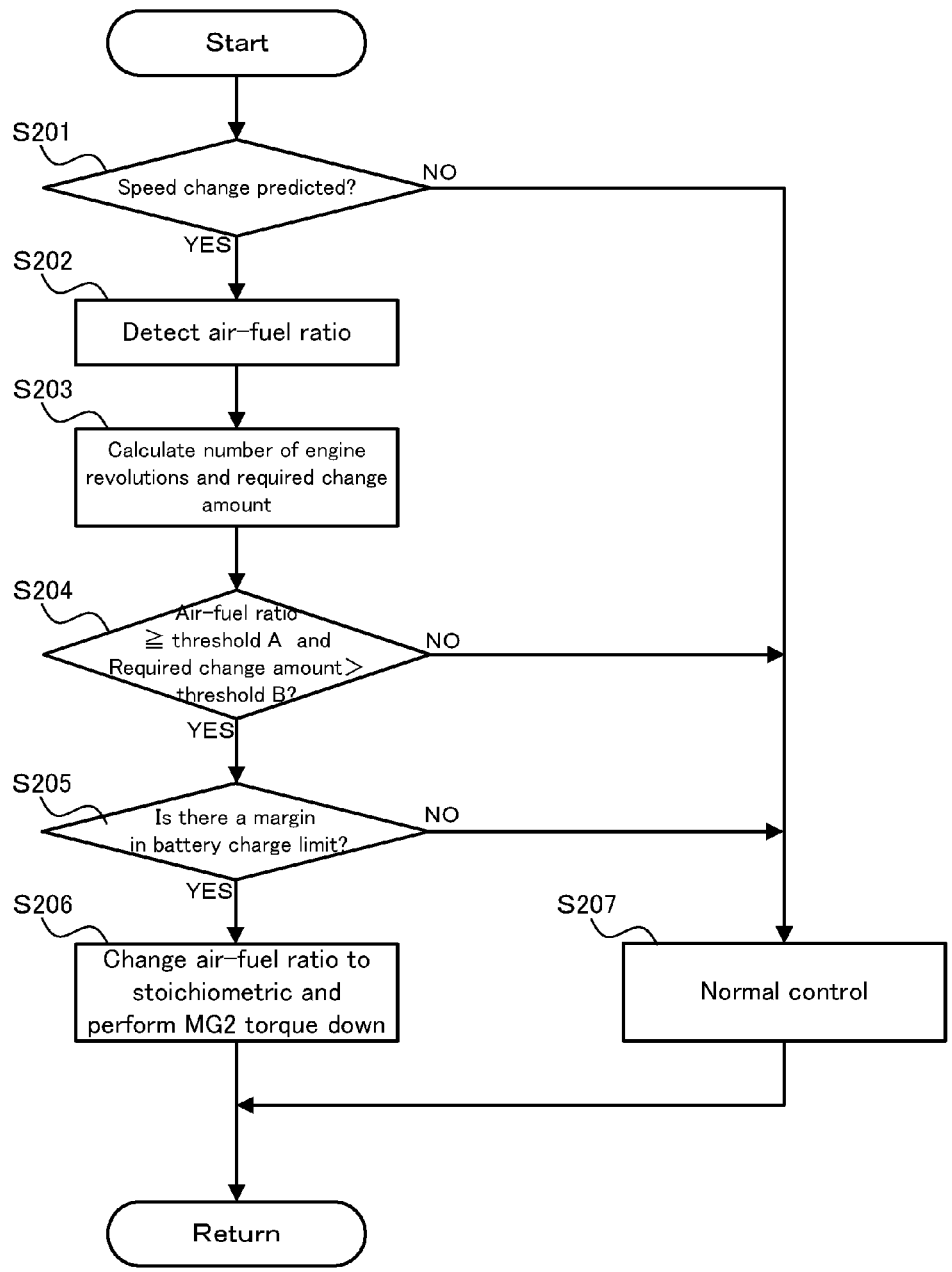
FIG. 14 is a flowchart illustrating operation of a control apparatus for a hybrid vehicle according to a second embodiment.

In FIG. 14, in operation of the control apparatus for the hybrid vehicle according to the second embodiment, the speed change is predicted by the transmission 400 on the HVECU 60 (step S201). Since the speed change prediction is the same as in the first embodiment (refer to FIG. 9), a detailed explanation here will be omitted.

If the speed change is not predicted (the step S201: NO), the normal control is performed in the hybrid vehicle 1 (step S207), and a series of process operations is ended. On the other hand, if the speed change is predicted (the step S201: YES), the air-fuel ratio of the engine 200 is detected by the air-fuel ratio sensor 67 (step S202). Moreover, the required change amount of the number of revolutions of the engine 200 (i.e. the number of revolutions required to be changed in the speed change) is calculated on the HVECU 60, on the basis of the present number of revolutions of the engine 200, the gear ratio after the speed change, or the like (step S203).

If the air-fuel ratio and the required change amount are obtained, it is determined on the HVECU 60 whether or not the air-fuel ratio is greater than or equal to the threshold value A and whether or not the required change amount is greater than the threshold value B (step S204). In other words, as in the first embodiment, it is determined whether or not it is the situation in which the detrimental effect in the speed change may occur.

If it is determined that the air-fuel ratio is not greater than or equal to the threshold value A or that the required change amount is not greater than the threshold value B (the step S204: NO), it is determined that there is no detrimental effect even if particular control is not performed, and the normal control is performed (the step S206). On the other hand, if it is determined that the air-fuel ratio is greater than or equal to the threshold value A and that the required change amount is greater than the threshold value B (the step S204: YES), it is determined whether or not there is a certain degree of margin or room in the charge limit of the battery (step S205). Specifically, it is determined whether or not there is a margin in the charge limit of the battery to the extent that a variation in the battery balance associated with air-fuel ratio change control described above can be responded to.

If it is determined that there is no margin in the charge limit of the battery (the step S205: NO), a subsequent process is not performed, and the normal control is performed (step S207). On the other hand, if it is determined that there is the margin in the charge limit of the battery (the step S205: YES), the air-fuel ratio is changed from lean to stoichiometric (i.e. to be richer), and the torque down control of the motor generator MG2 is performed (step S206).

According to the aforementioned control, the sufficient possible amount of the torque down can be ensured before the speed change is performed, even if the possible amount of the torque down is not sufficient at the speed change prediction time point. In other words, the possible amount of the torque down that is reduced due to the lean combustion is increased by changing to the stoichiometric combustion, by which the sufficient possible amount of the torque down is ensured. Moreover, the output torque of the motor generator MG2 is controlled to be reduced, and an influence of an increase in output of the engine due to the change of the air-fuel ratio to be richer is reduced.

To what extent the air-fuel ratio is changed to be richer may be determined in accordance with a shortage of the possible amount of the torque down. For example, if the air-fuel ratio is higher (i.e. if the air-fuel ratio is leaner), the air-fuel ratio may be further changed to be richer. If the required change amount to the number of engine revolutions is higher, the air-fuel ratio may be further changed to be richer.

<Specific Example of Speed Change Control>

Next, with reference to FIG. 15 and FIG. 16, an explanation will be given to a specific example of the speed change control according to the second embodiment. FIG. 15 is a time chart illustrating up-shift control by the control apparatus for the hybrid vehicle according to the second embodiment. FIG. 16 is a time chart illustrating down-shift control by the control apparatus for the hybrid vehicle according to the second embodiment.

Figure 15:
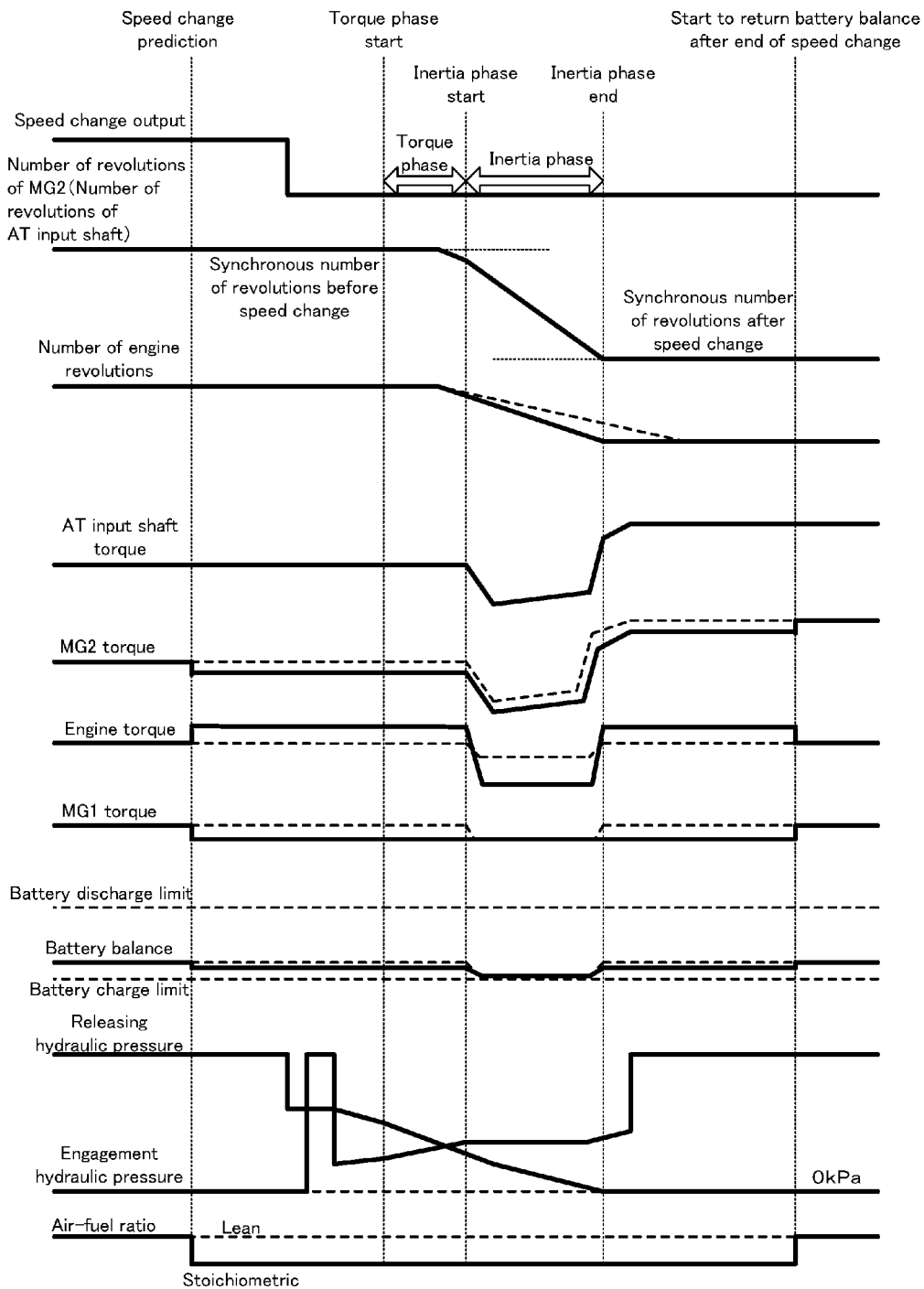
FIG. 15 is a time chart illustrating up-shift control by the control apparatus for the hybrid vehicle according to the second embodiment.

As illustrated in FIG. 15, according to the second embodiment, the air-fuel ratio is changed to be richer at a time point at which the up-shift is predicted. Thus, the torque variation of the engine 200 is reduced, and the possible amount of the torque down is increased. Thus, the torque down control can be performed by the control of the engine 200 itself (e.g. retarded ignition timing control, etc.). After the end of the speed change, control for returning the air-fuel ratio to a state before the speed change (i.e. to be leaner) is performed.

In air-fuel ratio control in the speed change prediction, the output torque of the engine 200 is increased as illustrated in the drawing. Thus, total output torque is adjusted by reducing the output torque of the motor generator MG2. In the same manner, in air-fuel ratio control after the end of the speed change, the output torque of the engine 200 is reduced as illustrated in the drawing. Thus, the total output torque is adjusted by increasing the output torque of the motor generator MG2.

Figure 16:
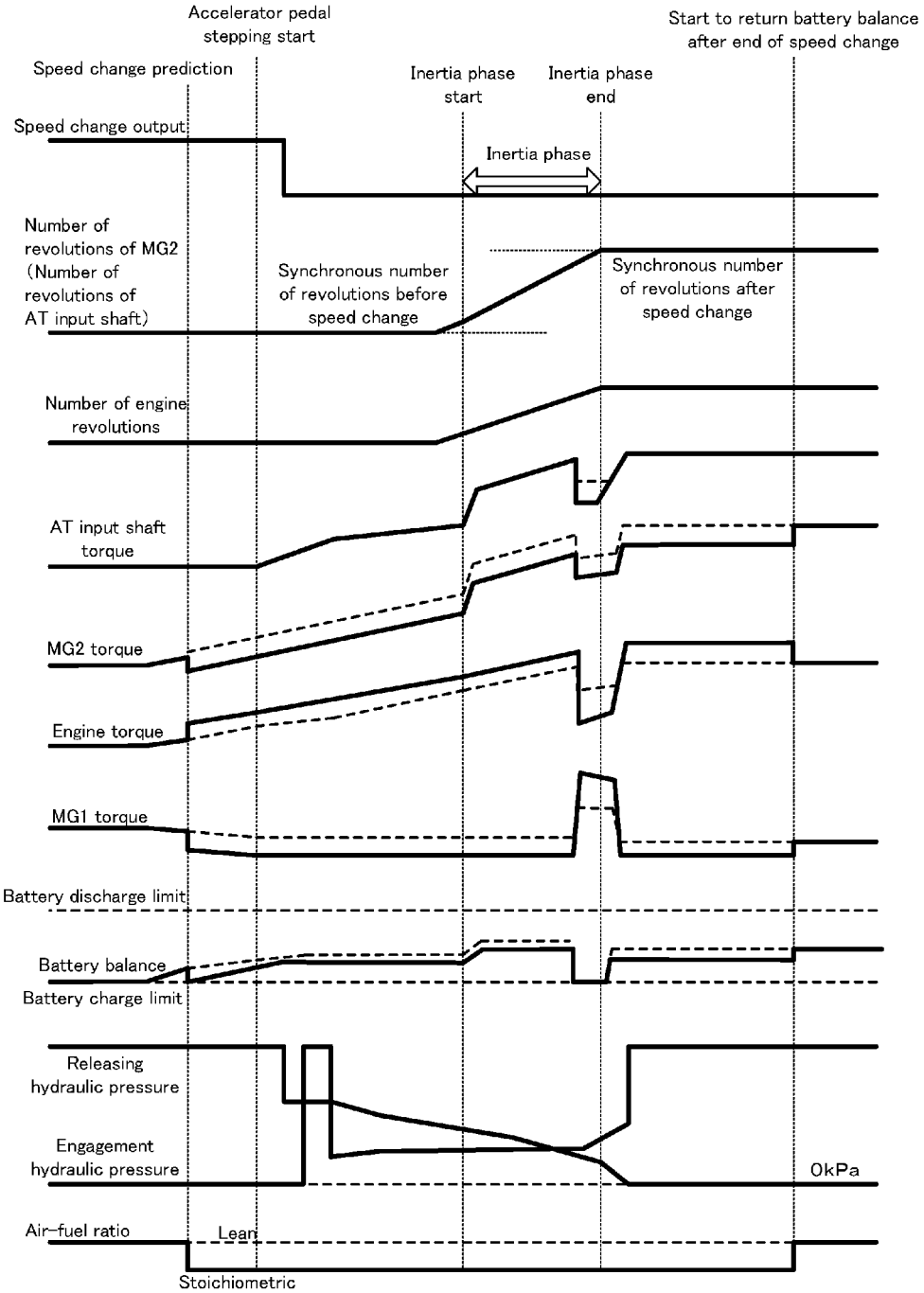
FIG. 16 is a time chart illustrating down-shift control by the control apparatus for the hybrid vehicle according to the second embodiment.

As illustrated in FIG. 16, according to the second embodiment, the air-fuel ratio is changed to be richer at a time point at which the down-shift is predicted. Thus, the torque variation of the engine 200 is reduced, and the possible amount of the torque down is increased. Thus, the torque down control can be performed by the control of the engine 200 itself (e.g. retarded ignition timing control, etc.). After the end of the speed change, the control for returning the air-fuel ratio to the state before the speed change (i.e. to be leaner) is performed.

As in the up-shift, in the air-fuel ratio control in the speed change prediction, the output torque of the engine 200 is increased. Thus, the total output torque is adjusted by reducing the output torque of the motor generator MG2. Moreover, in the air-fuel ratio control after the end of the speed change, the output torque of the engine 200 is reduced. Thus, the total output torque is adjusted by increasing the output torque of the motor generator MG2.

As explained above, according to the control apparatus for the hybrid vehicle in the second embodiment, the possible amount of the torque down by the control of the engine itself can be increased by predicting the speed change and changing the air-fuel ratio. Thus, even in the lean combustion of the engine 200 in the speed change prediction, the torque down control can be sufficiently realized when the speed change is performed. It is therefore possible to avoid the detrimental effect, such as the torque shock, the deterioration of durability of the friction material, and the like, which can occur in the speed change.

Third Embodiment

Next, a control apparatus for a hybrid vehicle according to a third embodiment will be explained with reference to FIG. 17. The third embodiment is partially different from the first and second embodiments in operation, and is substantially the same as the first and second embodiments in the other operation and apparatus configuration. Thus, hereinafter, the different part from those of the first and second embodiments will be explained in detail, and an explanation of the same part will be omitted, as occasion demands.

<Operation of Control Apparatus for Hybrid Vehicle>

Firstly, with reference to FIG. 17, operation of the control apparatus for the hybrid vehicle according to the third embodiment will be explained. FIG. 17 is a flowchart illustrating the operation of the control apparatus for the hybrid vehicle according to the third embodiment.

In FIG. 17, in operation of the control apparatus for the hybrid vehicle according to the third embodiment, the speed change is predicted by the transmission 400 on the HVECU 60 (step S301). Since the speed change prediction is the same as in the first embodiment (refer to FIG. 9), a detailed explanation here will be omitted.

If the speed change is not predicted (the step S301: NO), the normal control is performed in the hybrid vehicle 1 (step S309), and a series of process operations is ended. On the other hand, if the speed change is predicted (the step S301: YES), the air-fuel ratio of the engine 200 is detected by the air-fuel ratio sensor 67 (step S302). Moreover, the required change amount of the number of revolutions of the engine 200 (i.e. the number of revolutions required to be changed in the speed change) is calculated on the HVECU 60, on the basis of the present number of revolutions of the engine 200, the gear ratio after the speed change, or the like (step S303).

If the air-fuel ratio and the required change amount are obtained, it is determined on the HVECU 60 whether or not the air-fuel ratio is greater than or equal to the threshold value A and whether or not the required change amount is greater than the threshold value B (step S304). In other words, as in the first and second embodiments, it is determined whether or not it is the situation in which the detrimental effect in the speed change may occur.

If it is determined that the air-fuel ratio is not greater than or equal to the threshold value A or that the required change amount is not greater than the threshold value B (the step S304: NO), it is determined that there is no detrimental effect even if particular control is not performed, and the normal control is performed (the step S309). On the other hand, if it is determined that the air-fuel ratio is greater than or equal to the threshold value A and that the required change amount is greater than the threshold value B (the step S304: YES), it is determined whether or not there is a certain degree of margin or room in a discharge limit of the battery (step S305). Specifically, as explained in the first embodiment, it is determined whether or not the discharge limit of the battery is a problem if the battery balance is controlled to the discharge side. More specifically, if the battery balance is controlled to the discharge side, for example, when the battery balance is close to a discharge limit value at a time of the change prediction, it may cross the discharge limit value of the battery. Thus, the battery balance cannot be sufficiently changed to the discharge side. Therefore, in this case, it is determined that there is no margin in the discharge limit of the battery.

If it is determined that there is the margin in the discharge limit of the battery (the step S305: YES), the battery balance of the motor generator MG is changed on the basis of the air-fuel ratio and the required change amount (step S306). In other words, as in the first embodiment, the motor generator MG is set to be able to output larger torque by controlling the battery balance of the motor generator MG to the discharge side. It is therefore possible to perform the torque down control in the speed change.

On the other hand, if it is determined that there is no margin in the discharge limit of the battery (the step S306: NO), it is determined whether or not there is a certain degree of margin or room in the charge limit of the battery (step 307). In other words, it is determined that there is little possibility to increase the possible amount of the torque down by changing the battery balance, and it is determined whether or not the air-fuel ratio change control explained in the second embodiment can be performed.

If it is determined that there is the margin in the charge limit of the battery (the step S307: YES), the air-fuel ratio is changed from lean to stoichiometric (i.e. to be richer), and the torque down control of the motor generator MG2 is performed (step S308). In other words, the possible amount of the torque down that is reduced due to the lean combustion is increased by being changed to the stoichiometric combustion, and the sufficient possible amount of the torque down can be ensured. Moreover, the output torque of the motor generator MG2 is controlled to be reduced, and this reduces an influence of the increase in the output of the engine 200 due to the change of the air-fuel ratio to be richer.

If it is determined that there is no margin in the charge limit of the battery (the step S307: NO), it is determined that the battery balance cannot be changed and that the air-fuel ratio cannot be changed, and the normal control is performed (step S309).

As explained above, according to the control apparatus for the hybrid vehicle in the third embodiment, in the prediction of the speed change, one of the battery balance change control and the air-fuel ratio change control is selected and performed, as occasion demands, in accordance with conditions. Thus, even if one of the battery balance change control and the air-fuel ratio change control cannot be performed, the possible amount of the torque down can be certainly increased due to the other control. It is therefore possible to more avoid the detrimental effect, such as the torque shock, the deterioration of durability of the friction material, and the like, which can occur in the speed change.

The present invention is not limited to the aforementioned embodiments, but various changes may be made, if desired, without departing from the essence or spirit of the invention which can be read from the claims and the entire specification. A control apparatus for a hybrid vehicle that involves such changes is also intended to be within the technical scope of the present invention.

DESCRIPTION OF REFERENCE NUMERALS AND LETTERS 1 hybrid vehicle
6 drive shaft
60 HVECU
61 vehicle speed sensor
62 accelerator opening sensor
63 MG1 number-of-revolutions sensor
64 MG2 number-of-revolutions sensor
65 drive shaft number-of-revolutions sensor
66 SOC sensor
67 air-fuel ratio sensor
70 MGECU
71 engine ECU
72 ignition plug
101, 111 intake pipe
102 air flow meter
103 intake throttle valve
110 compressor
113 intercooler
120 turbine
115, 121 exhaust pipe
123 start converter 124 post-processing apparatus
125 EGR pipe
126 EGR valve
127 EGR cooler
200 engine
201 cylinder
210 injector
300 planetary gear mechanism
400 transmission
MG1, MG2 motor generator
S0, S1, S2 sun gear
CA0, CA1, CA2 carrier
R0, R1, R2 ring gear
C1, C2, C3 clutch
F1 one-way clutch
B1, B2 brake

The invention claimed is:

1. A control apparatus for a hybrid vehicle, configured to control a hybrid vehicle, the hybrid vehicle including:
 a power source including an internal combustion engine and an electric motor, the internal combustion engine being configured to change an air-fuel ratio; and
 a transmission configured to change a number of revolutions of the internal combustion engine,
 said control apparatus for the hybrid vehicle comprising:
 an air-fuel ratio sensor that measures an air-fuel ratio of the internal combustion engine in a predetermined period until speed change by the transmission is actually started; and
 a controller programmed to control at least one of the internal combustion engine and the electric motor in such a manner that an amount of torque down of the internal combustion engine is increased if the air-fuel ratio of the internal combustion engine is lean in the predetermined period,
 wherein the predetermined period until speed change is determined by an analytic expression based on current operating conditions.

2. The control apparatus for the hybrid vehicle according to claim 1, wherein said controller controls output distribution of the internal combustion engine and the electric motor in such a manner that the electric motor has larger output distribution when the air-fuel ratio of the internal combustion engine is lean than when the air-fuel ratio of the internal combustion engine in the predetermined period is rich.

3. The control apparatus for the hybrid vehicle according to claim 2, wherein said controller controls the output distribution in such a manner that the electric motor has larger output distribution as the air-fuel ratio of the internal combustion engine becomes leaner.

4. The control apparatus for the hybrid vehicle according to claim 2, wherein said controller controls the output distribution in such a manner that the electric motor has larger output distribution as a required change amount of the number of revolutions increases with respect to the internal combustion engine when the speed change is performed.

5. The control apparatus for the hybrid vehicle according to claim 1, wherein said controller controls the internal combustion engine to change the air-fuel ratio thereof to be richer, and controls the electric motor to reduce an output thereof.

6. The control apparatus for the hybrid vehicle according to claim 5, wherein said controller controls the internal combustion engine to change the air-fuel ratio thereof to be richer as a required change amount of the number of revolutions increases with respect to the internal combustion engine when the speed change is performed.

* * * * *